US008572827B1

(12) United States Patent
Chou

(10) Patent No.: US 8,572,827 B1
(45) Date of Patent: Nov. 5, 2013

(54) METHOD AND APPARATUS FOR SINGLE HAND ATTACHMENT OF DRYWALL CORNER BEADS WITH STAPLES

(71) Applicant: Kam Wa Chou, Boston, MA (US)

(72) Inventor: Kam Wa Chou, Boston, MA (US)

(73) Assignees: See Wai Chan, Boston, MA (US); Henry G. Chou, Boston, MA (US)

( * ) Notice: Subject to any disclaimer, the term of this patent is extended or adjusted under 35 U.S.C. 154(b) by 0 days.

(21) Appl. No.: 13/688,899

(22) Filed: Nov. 29, 2012

Related U.S. Application Data

(63) Continuation-in-part of application No. 13/280,879, filed on Oct. 25, 2011, which is a continuation-in-part of application No. 11/409,231, filed on Apr. 21, 2006, now Pat. No. 8,042,243.

(60) Provisional application No. 60/761,546, filed on Jan. 24, 2006.

(51) Int. Cl.
*B21D 31/02* (2006.01)
*B23P 11/00* (2006.01)

(52) U.S. Cl.
USPC ......... 29/243.5; 29/798; 29/897.312; 72/325; 227/155

(58) Field of Classification Search
USPC ........ 29/243, 243.5, 244, 275, 278, 432, 798; 72/325; 227/109, 119, 140, 148, 156, 227/155, 177.1, 178.1
See application file for complete search history.

(56) References Cited

U.S. PATENT DOCUMENTS

| | | | |
|---|---|---|---|
| 879,547 | A | 2/1908 | Holter |
| 2,189,573 | A | 2/1940 | Wegner |
| 2,944,262 | A | 7/1960 | Richman et al. |
| 4,127,226 | A | 11/1978 | Jaspar |
| 4,228,016 | A | 10/1980 | Hunter |
| 4,288,016 | A | 9/1981 | Failla et al. |
| 4,574,452 | A | 3/1986 | Kennedy et al. |
| 4,593,443 | A | 6/1986 | Wolford |
| 4,893,493 | A | 1/1990 | Jacques et al. |
| 4,989,438 | A | 2/1991 | Simon |
| 5,065,930 | A | 11/1991 | Kennedy |
| 5,313,755 | A | 5/1994 | Koenig, Jr. |
| 5,368,461 | A | 11/1994 | Murphy |
| 5,524,807 | A | 6/1996 | Bullard |
| 5,531,050 | A | 7/1996 | Stibolt et al. |
| 5,615,530 | A | 4/1997 | Kartler |

(Continued)

OTHER PUBLICATIONS

Non-final Office Action (Restriction Requirement) dated Feb. 4, 2010, U.S. Appl. No. 11/409,231.

(Continued)

*Primary Examiner* — Alexander P Taousakis
(74) *Attorney, Agent, or Firm* — Burns & Levinson LLP; Bruce D. Jobse, Esq.

(57) ABSTRACT

This disclosure provides a tool or an apparatus that can be held and operated with one hand to attach a corner bead to an outside corner of drywall. In one example, the tool includes a frame, a pair of contact surfaces rigidly coupled to the frame, a handle pivotally attached to the frame, a pair of stapler units rigidly coupled to the frame, and a linkage mechanism comprising a pair of transmission arms and mechanically coupling the handle to the stapler units for translating a force displacing the handle from a first position into a controlled motion of the transmission arms, thereby triggering the stapler units to release fastening pieces.

18 Claims, 26 Drawing Sheets

(56) References Cited

U.S. PATENT DOCUMENTS

| | | | | |
|---|---|---|---|---|
| 5,647,182 | A | 7/1997 | Rutherford | |
| 5,667,126 | A | 9/1997 | Boucek | |
| 5,916,101 | A | 6/1999 | Stibolt | |
| 5,934,149 | A | 8/1999 | Tuda | |
| 5,950,902 | A | 9/1999 | Moore, Sr. | |
| 8,042,243 | B1 * | 10/2011 | Chou | 29/243.5 |

OTHER PUBLICATIONS

Amendment and Response to Restriction Requirement dated Mar. 3, 2010, U.S. Appl. No. 11/409,231.

Non-final Office Action dated Apr. 28, 2010, U.S. Appl. No. 11/409,231.

Amendment dated Jul. 28, 2010, U.S. Appl. No. 11/409,231.

Final Office Action dated Oct. 14, 2010, U.S. Appl. No. 11/409,231.

Amendment and Response to Office Action dated Jan. 14, 2011, U.S. Appl. No. 11/409,231.

Advisory Action dated Jan. 27, 2011, U.S. Appl. No. 11/409,231.

Non-final Office Action dated Mar. 4, 2011, U.S. Appl. No. 11/409,231.

Amendment and Response to Office Action dated May 10, 2011, U.S. Appl. No. 11/409,231.

* cited by examiner 116C
116
116D
116B
C
C 116C
116D
116B
C
C

116

METHOD AND APPARATUS FOR SINGLE HAND ATTACHMENT OF DRYWALL CORNER BEADS WITH STAPLES

RELATED APPLICATIONS

The present application is a continuation-in-part of co-pending U.S. application Ser. No. 13/280,879, filed on Oct. 25, 2011, which is a continuation-in-part of U.S. application Ser. No. 11/409,231, filed on Apr. 21, 2006, now U.S. Pat. No. 8,042,243, issued on Oct. 25, 2011, which claims the benefit of priority to U.S. Provisional Application Ser. No. 60/761,546, filed on Jan. 24, 2006, the subject matters of which are incorporated herein in their entireties by this reference for all purposes.

FIELD OF THE INVENTION

The present invention relates generally to tools for construction purposes, and particularly to an apparatus for enabling single-handed attachment of corner beads to drywall configurations.

BACKGROUND OF THE INVENTION

Drywall is used pervasively well in commercial and residential constructions because of its ease of handling and ability to be cut into various shapes and/or sizes. When two pieces of drywall are joined to form a right angle, i.e., an outside corner, an elongated metal frame known as a corner beads is mechanically secured over the outside corner to provide support and to maintain the drywall pieces prior to application of a finishing materials for thereover. Prior devices for attachment of corner beads to drywall corners usually require the worker to use one hand to hold a forming tool against the corner bead, thereby pressing the corner bead against the drywall pieces, while the workers second hand is used to apply pressure to the forming tool, typically with a rubber hammer. Because drywall corners may occur not only vertically but horizontally, it is sometimes awkward to use both hands for attachment of corner beads, particularly when a worker must utilize both hands overhead to manipulate the forming tool and hammer. Also, when applying pressure to the forming tool with repeated blows from a hammer, loosening of another portion of the corner bead already attached is quite common.

Some attempts have been made to simplify and automate the process of attaching a corner bead to an outside corner. For example, U.S. Pat. Nos. 4,288,016; 4,989,438; 5,524,807; 5,667,126; and 5,950,902 disclose apparatus for automated attachment of a corner bead to an outside drywall corner and, although, some of these devices theoretically may be hand-held, many utilize external sources of power such as pressurized air or electric current to operate pairs of fastening guns. As such, these apparatus are rather heavy and do not appear to be easily operated with only a single hand, particularly for overhead use. In addition, for externally powered devices, the coupling to the external power source limits mobility of the operator during utilization of the tool. A further drawback of a fastening-gun type apparatus is that the fastening element, whether a screw, staple or other device, oftentimes separates from the drywall any corner bead, i.e. "pops" overtime often due to environmental and stress factors.

Accordingly, a need exists for an apparatus that enables single-handed attachment of corner beads to drywall configurations.

A further need exists for an apparatus that enables single-handed attachment of corner beads to drywall configurations that is light and easily handled, particularly for overhead use.

A further need exists for an apparatus that enables single-handed attachment of corner beads to drywall configurations that uses only manual power to couple the corner bead to the drywall.

A further need exists for an apparatus that enables attachment of corner beads to drywall configurations without fasteners or other attachment devices.

SUMMARY OF THE INVENTION

The invention contemplates a tool that can be held and operated with one hand to attach a corner bead to an outside corner of drywall. A substantially V-shaped member having a pair of interior surfaces disposed at an angle of less than 100° has a frame or handle attached thereto. The handle may be sized and shaped to fit comfortably in the palm of a human hand. A lever is pivotally attached to the handle. A pair of opposed pincers having pointed tips which extend through apertures within the pair of interior surfaces are movably coupled to the V-shaped member so as to allow the tips to move in a converging direction. A mechanical linkage system translates force applied to the lever into a the converging motion of the pincers.

In one embodiment, the mechanical linkage system comprises a number of support posts attached to the V-shaped member. The first or center of the support posts is attached at the exterior center of the V-shaped member near one end thereof. The second and third support posts are attached at the same end along the exterior surfaces forming the V-shape. The non-pointed ends of the pincers are pivotally joined together at a point along the center support post. A spring biases the pincers into an open or divergent configuration. An L-shaped linkage is pivotally mounted to each of second and third support posts. In the illustrative embodiment, the short leg of each L-shaped linkage is in contact with one of the pincers. The longer leg of each L-shaped linkage is pivotally coupled to the first end of one of the two extension members. The extension members are pivotally coupled at their respective second ends to a carriage slidably disposed within a track or groove in the center support post. A tab extending from the carriage is secured to one end of a cable. The second end of the cable is pivotally secured to the previously described lever. In the illustrative embodiment the cable is of a coaxial design with a movable multistrand wire core extending through a semi-rigid tubular sheath. An extreme end of the wire core is attached to the carriage tab while the extreme end of the wire is coupled to the top of the center support post. A tension mechanism, such as a coiled spring, is disposed about unsheathed or exposed length of the wire core to bias the wire/carriage away from the top of the center support post, and, therefore, bias the lever into an open position.

In use, the operator places the handle in the palm of his/her hand and squeezes the lever with the fingers of the same hand. The force applied to the lever causes the lever to pivot thereby causing the wire core of the cable to be at least partially retracted back into the exterior sheath. As the wire core is retracted, force is placed against the coiled spring causing a controlled movement of the carriage mechanism within the groove and towards the top of the center support post. As the carriage mechanism slides away from the V-shaped member, force is transmitted through the extension members and causes each of the respective L-shaped members to pivot at their respective support posts, forcing their respective short legs to urge the pincers in a converging direction in the interior of the V-shaped member.

To attach a corner bead to an exterior drywall corner, the corner bead is disposed with the V-shaped member of the apparatus and the lever actuated so that the converging pincers, particularly the pointed ends thereof, force portions of the corner bead into the drywall thereby frictionally engaging the corner bead to the drywall surfaces at opposing pairs of locations. Repeated use of the apparatus allows the corner beads to be mechanically secured, without additional fastening devices or adhesives, at multiple locations simply by repositioning the apparatus along the corner bead and actuating the lever handle.

Certain corner beads are made of hard metals or other materials that are difficult to deform. To attach such corner beads to a drywall, it may be necessary to use staples or fastening pieces. Accordingly, stapler units may be used in place of the pincers in the apparatus of the present invention.

When operating the fastening apparatus having stapler units, an operator may use a single hand to hold the fastening apparatus at a gripping area and move the fastening apparatus towards a corner bead that contacts a drywall. The operator then exerts a force by pushing the gripping area toward the corner bead. The force is then transmitted to a pair of stapler units through a force transmission mechanism, thereby triggering stapler units to release staples or fastening pieces into the corner bead and an exterior corner of the drywall. As a result, the fastening pieces create a firm attachment of the corner bead to the drywall.

According to another aspect of the invention, there is provided an apparatus for enabling single-handed attachment of corner beads, the apparatus comprising: a frame having a pair of contact members for receiving a corner bead, the contact members having a release opening; a force exertion mechanism securely fastened to the frame; and a pair of stapler units securely fastened to the contact members, the stapler units comprising a slit for ejecting fastening pieces from the staple units, wherein the slit is aligned to the release opening, such that the fastening pieces are ejectable from the stapler units to the corner beads through the contact members.

According to another aspect of the invention, there is provided an apparatus for enabling single-handed attachment of corner beads, the apparatus comprising: a frame having a pair of contact members for receiving a corner bead, the contact members being formed to define a ridge of the frame; a fulcrum disposed on the ridge of the frame; a handle pivotably coupled to the fulcrum; a support post disposed on the ridge of the frame, the support post defining a flat surface facing toward an end of the frame; a pair of stapler units disposed on the contact members; and a force splitting mechanism disposed on the flat surface of the support post, wherein the force splitting mechanism is coupled to an end of the handle to receive a force, and wherein the force splitting mechanism transfers the force from the handle to the pair of the stapler units.

BRIEF DESCRIPTION OF THE DRAWINGS

The above and further advantages of the invention may be better understood by referring to the following description in conjunction with the accompanying drawings in which.

DETAILED DESCRIPTION

Figure 1:
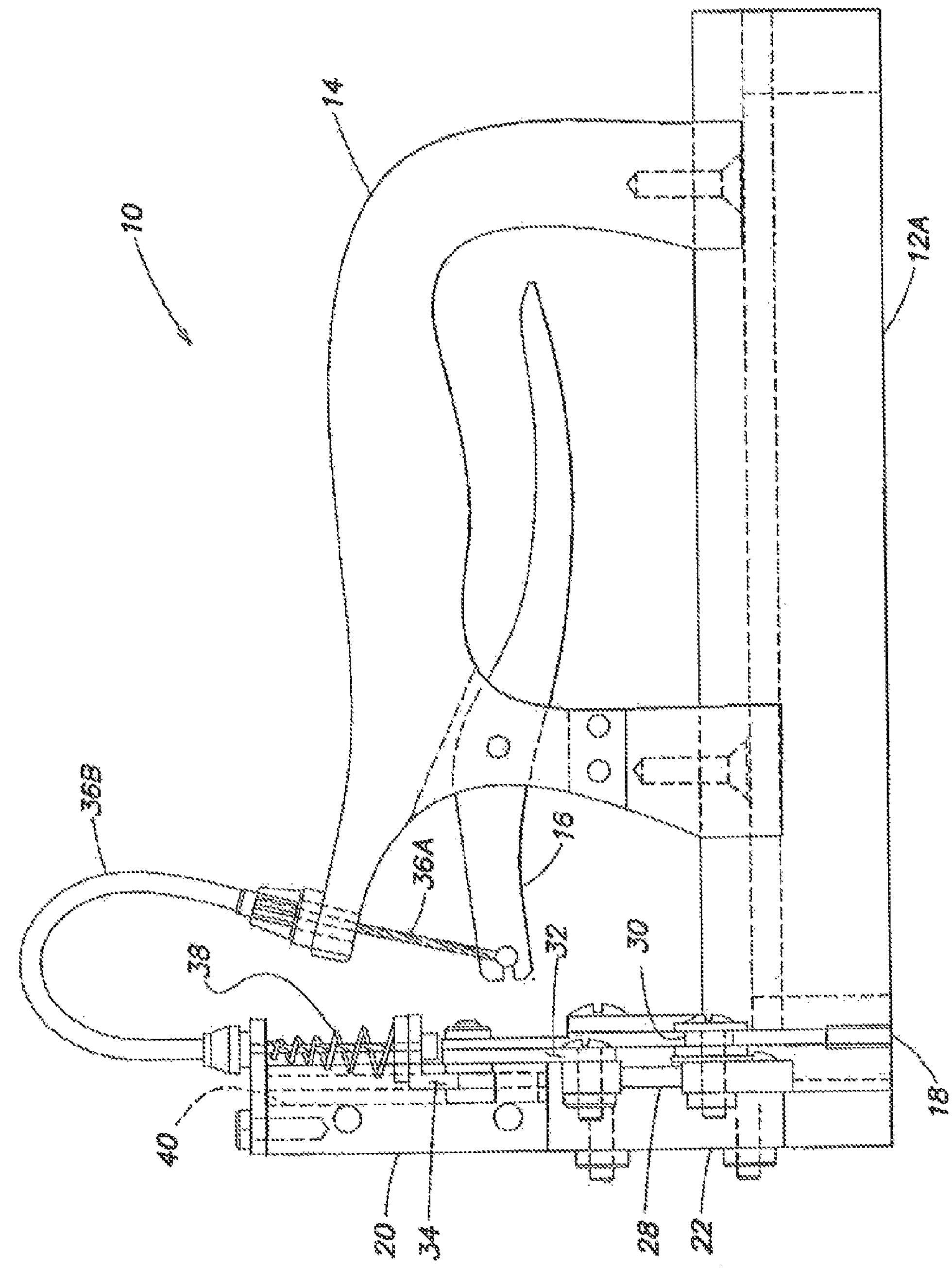
FIG. 1 is a side, cut-away view of the fastening apparatus of the present invention.
Figure 2:
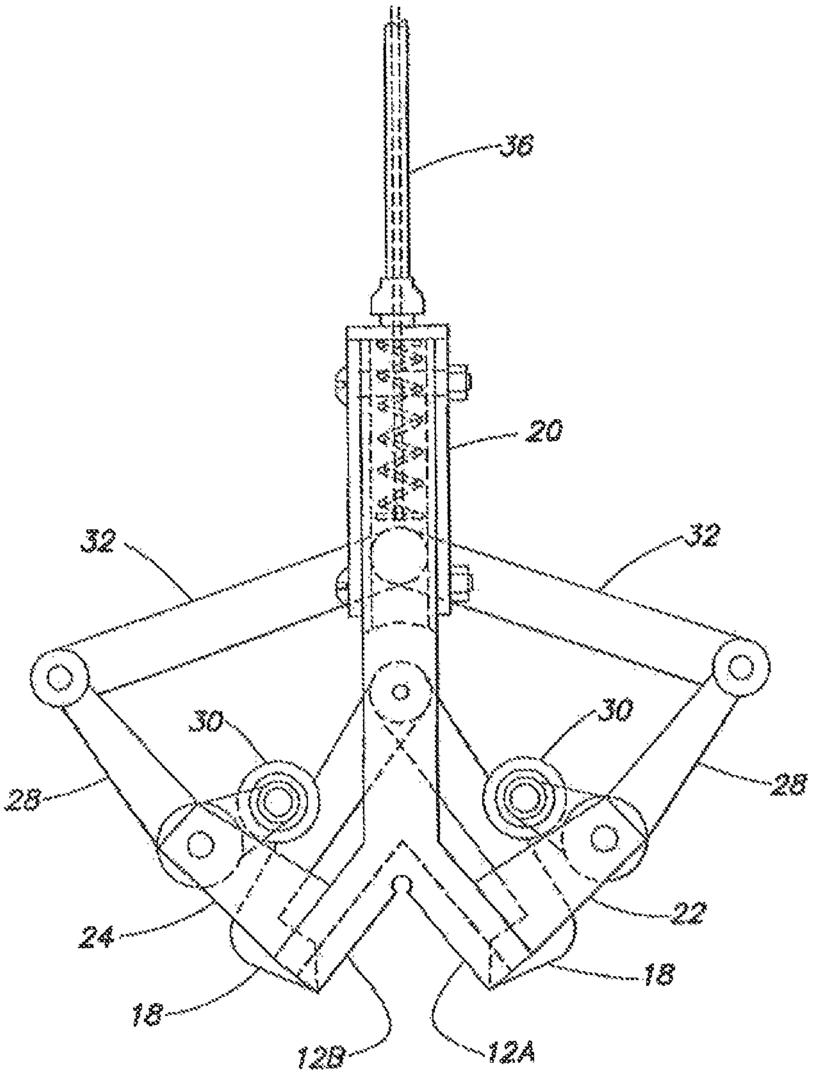
FIG. 2 is a front end, cut-away view of the fastening apparatus of FIG. 1.

The invention contemplates a tool that can be held and operated with one hand to attach a corner bead to an outside corner of drywall. According to an illustrative embodiment of the invention, referring to FIGS. 1-7, a fastening apparatus 10 comprises a V-shaped frame 12, a handle 14, a lever 16, a pair of opposed pincers 18, support posts 20-24, and linkage system 26, configured as illustrated. FIG. 1 is a side, cut-away view of the fastening apparatus 10 of the present invention;

while FIG. 2 is a front end, cut-away view of the fastening apparatus 10. Unless otherwise noted, any of items 12-24 may be made from precision cast aluminum.

Figure 3A:
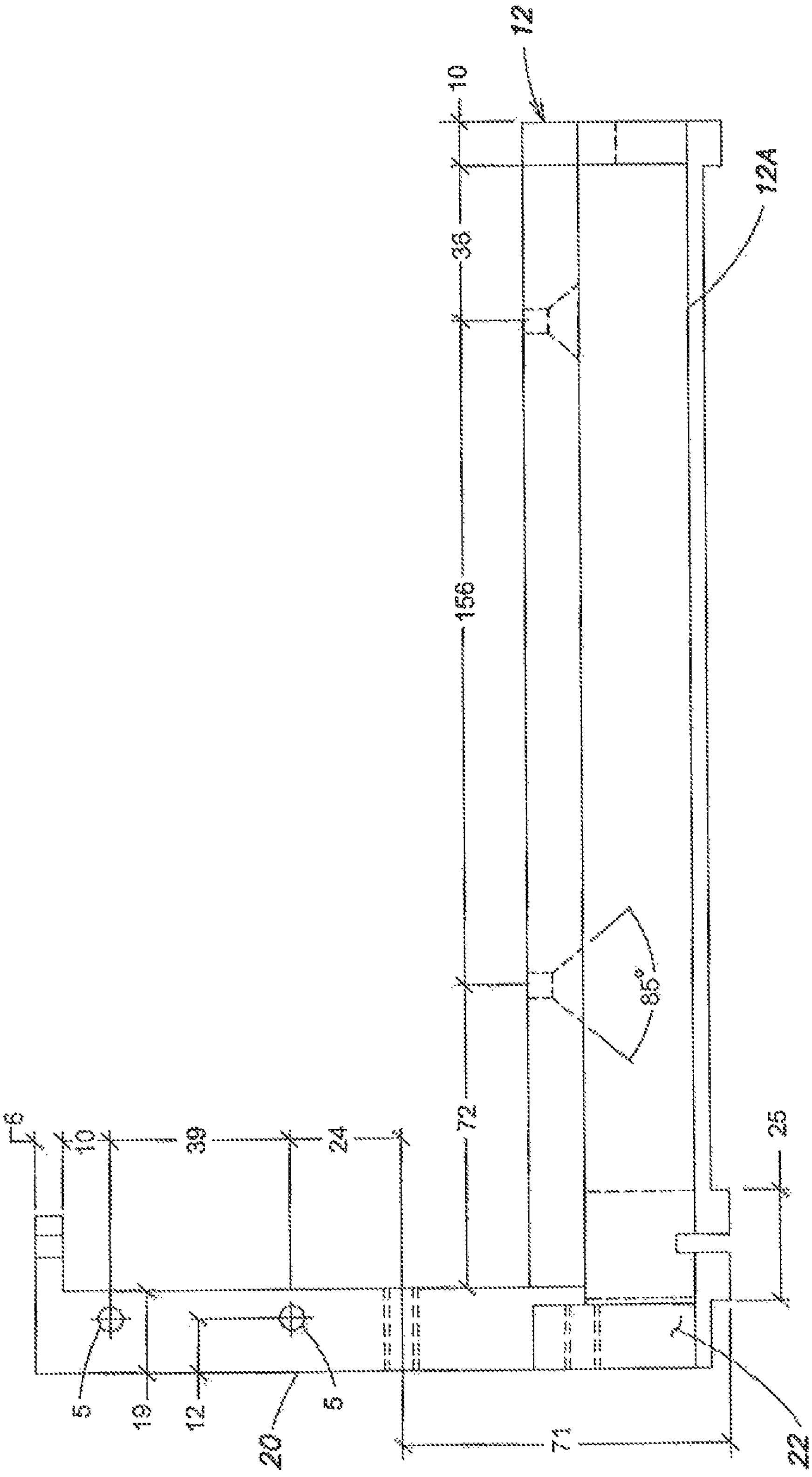
FIGS. 3A-B are side and top views of the frame of the fastening apparatus of FIG. 1 illustrating the positions of multiple support posts attached thereto.
Figure 3B:
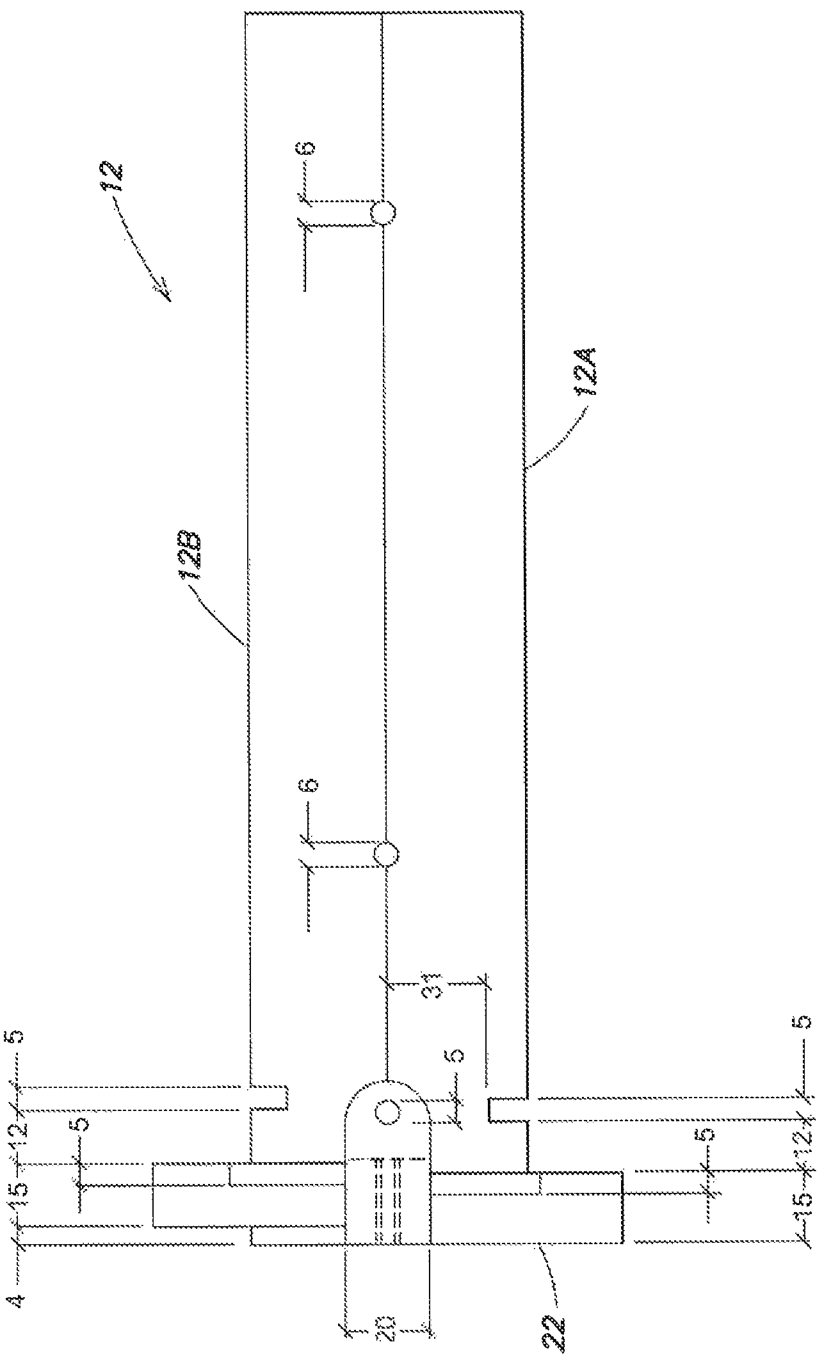

FIGS. 3A-B illustrate side and top views of V-shaped frame 12, V-shaped frame 12 is defined by a pair of flat members 12A-B integrally formed to define a V-shaped interior whose surfaces are disposed at an angle of less than 100° from each other. The apex of the angle defines a partial cylindrical portion of approximately greater than 180°. Note that the partial cylindrical portion may extend along all or a portion of members 12A-B. Frame 12 is designed to receive a standard designed corner bead so that the bead flanges rests against members 12A-B. In the illustrative embodiment, members 12A-B have a generally rectangular shape which extends the length of frame 12. However, in an alternative embodiment, members 12A-B may be shortened to a length that is adequate to receive the corner bead flanges therein. Also, the interior surface angle defined by members 12A-B may be greater than 100° if adequate adaptors are disposed therein to form an angle that is adequate for receiving the corner bead. For example, an interior angle of 110° formed by members 12A-B may be effectively narrowed by attaching wedge-shaped adapters to the interior surfaces of members 12A-B so that the effective interior angle is 80°, for example. As noted, frame 12 may be formed integrally from precision cast aluminum or other materials having suitable rigidity. Alternatively, frame 12 may be manufactured from the plurality of components attached together. In yet another embodiment, members 12A-B may be pivotally joined at their apex so as to adapt to variations in corner bead designs.

Figure 4:
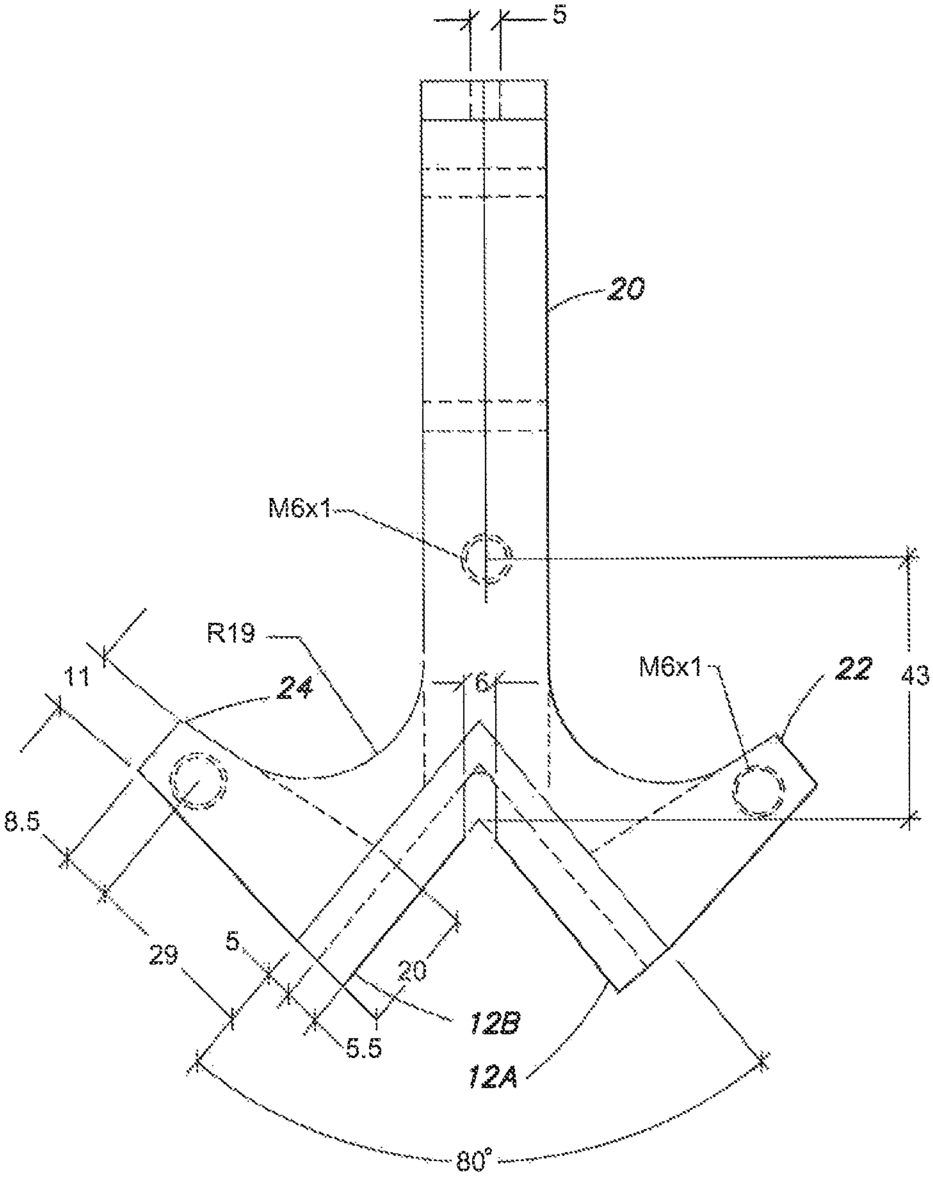
FIG. 4 is a front view of the frame of FIGS. 3A-B.

FIG. 4 is a front view of the frame of FIGS. 3A-B illustrating the position of center support post 20, and side support posts 22-24. As illustrated, support posts 20-24 have a generally rectangular cross-sectional shape over majority of their length, although other shapes and heights may be suitably utilized depending on the implementation of linkage system 26. In the illustrative embodiment, center support post 20 is disposed opposite the apex of the interior angle formed by members 12A-B, while side support posts 22-24 are disposed on the exterior surface of one of the respective frame member 12 and at approximately a right angle thereto. Support posts 20-24 may be formed integrally from precision cast aluminum or other materials having suitable rigidity, along with the other elements comprising frame 12. Alternatively, one or more of support posts 20-24 frame 12 may be manufactured from separate components attached together, for example, welded steel components.

Figures 5A, 5B:
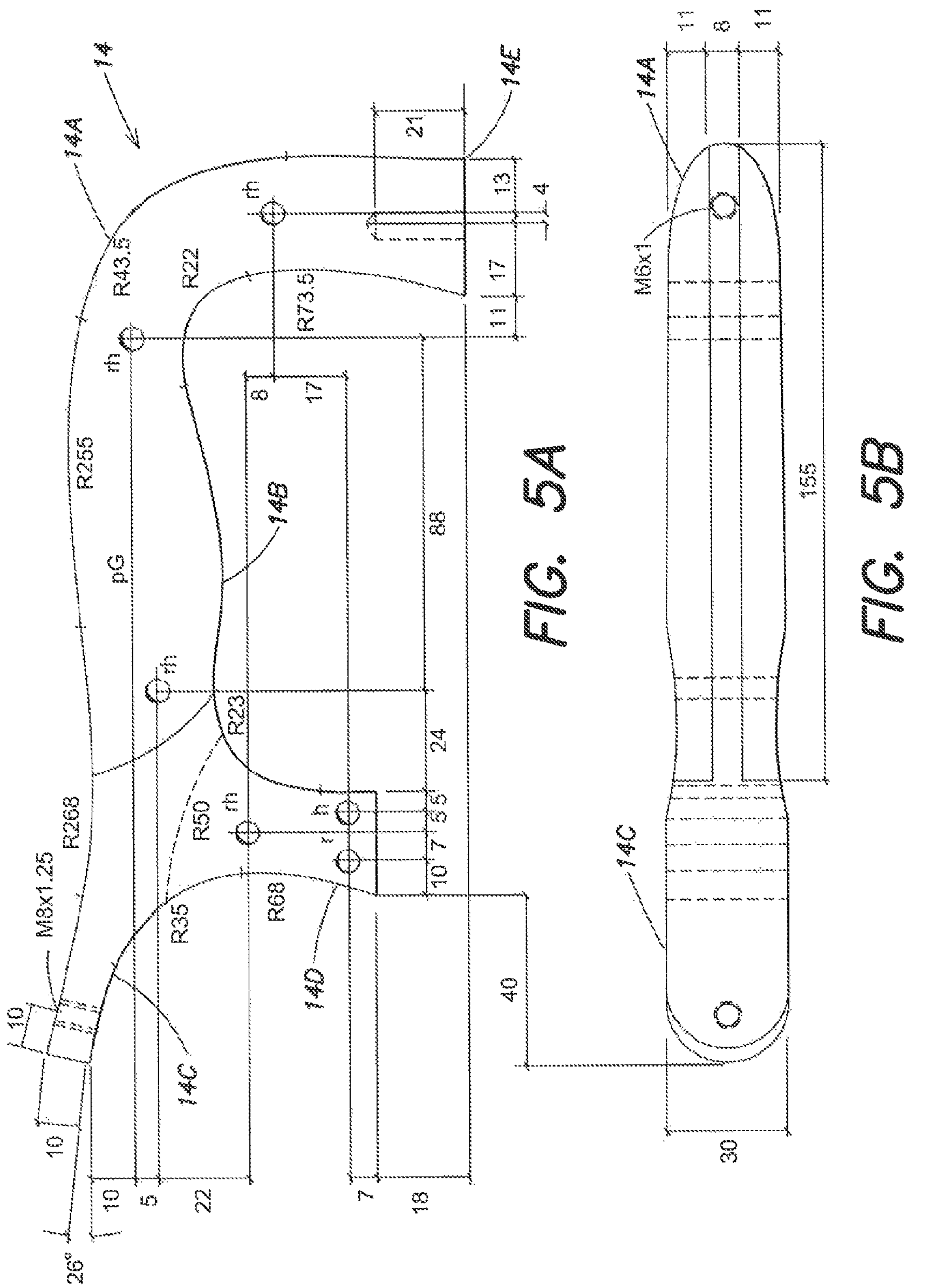
FIGS. 5A-B are side and top views of the handle of the fastening apparatus of FIG. 1.
Figure 6A:
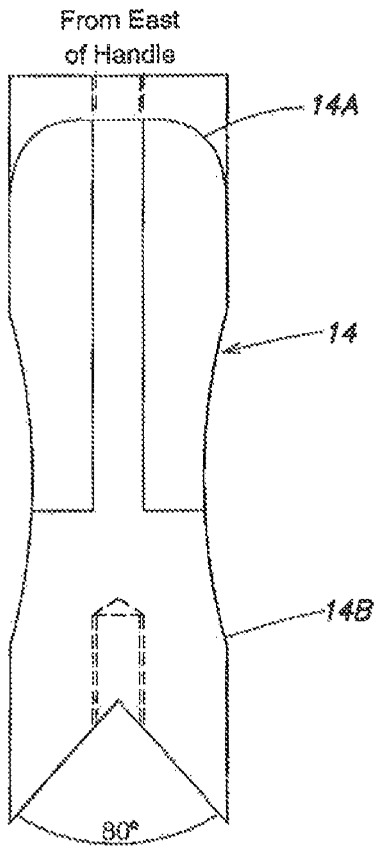
FIGS. 6A-D are rear, front, partial rear, and partial side, views, respectively, of the handle of the fastening apparatus of FIG. 5A-B.
Figure 6B:
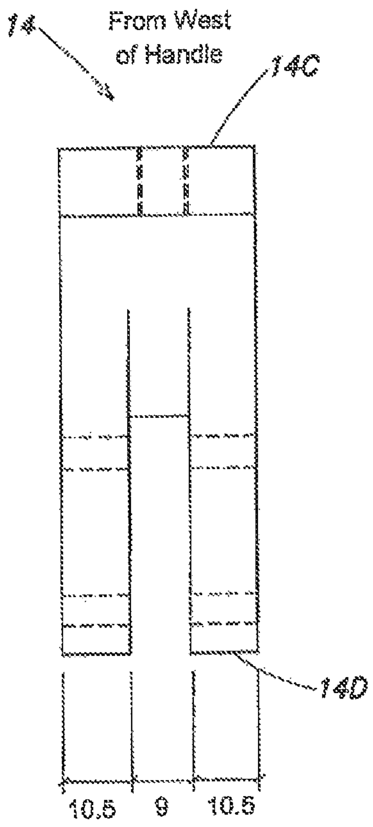
Figure 6C:
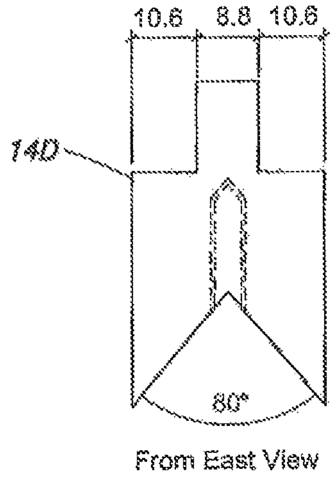
Figure 6D:
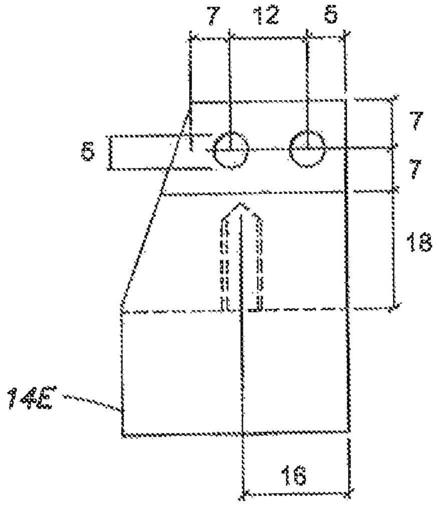

Handle 14 has an inverted U-shape defining a gripping area 14B and interconnecting legs 14D-E. FIGS. 5A-B are side and top views of the handle 14 according to the illustrative embodiment. As illustrated in FIG. 5A, handle 14 may have a rounded end 14A and a gripping area 14B characterized by rounded exterior surfaces to accommodate grasping or placement within the palm of the operator's hand. Gripping area 14B may be formed out plastic or other synthetic resins, as well as natural or synthetic rubber or combinations thereof, or any other suitable material that has a high enough coefficient of friction to ensure a secure grip while preventing fatigue to the operator's hand over prolonged periods. An aperture extends through handle end 14C to accommodate the tension cable of linkage system 26, as explained hereinafter. A second aperture extends through one of the legs of handle end 14 to facilitate pivotal mounting of lever 16, as explained hereinafter. FIGS. 6A-D illustrate additional rear, front, partial rear, and partial side views, respectively, of the handle 14. Legs 14D-E of U-shaped handle 14 are formed at an angle which mimics the exterior angle formed by members 12A-B to facilitate the attachment of handle 14 to frame 12.

Figure 7A:
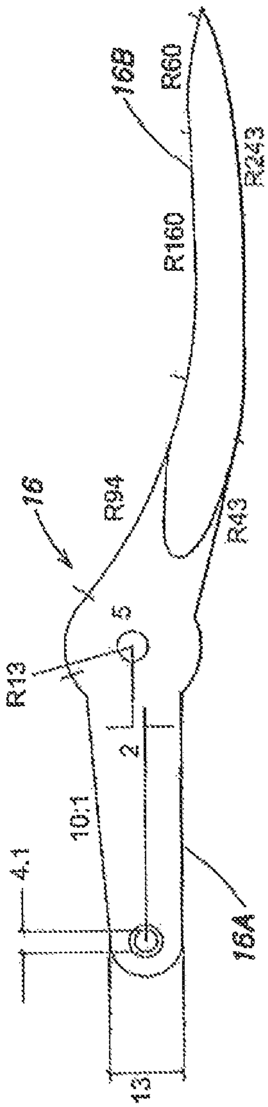
FIGS. 7A-B are side and top views of the lever of the fastening apparatus of FIG. 1.
Figure 7B:
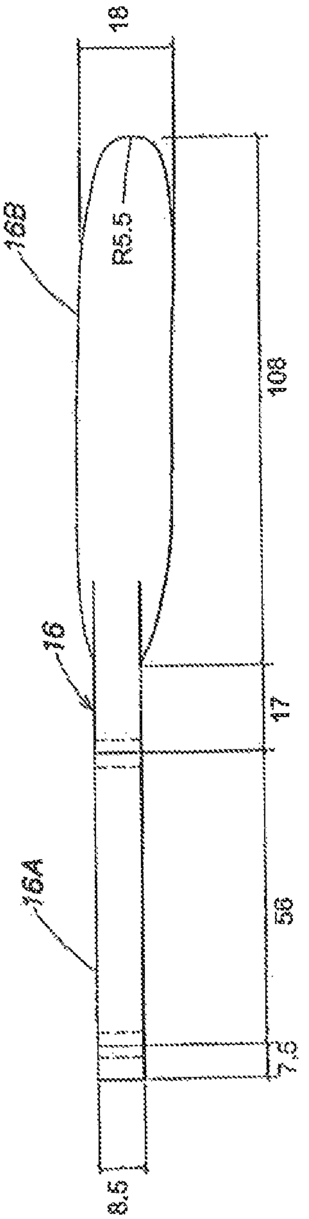

Lever 16 is pivotally coupled to leg 14D of handle 14. Lever 16 also defines an elongated gripping area 16B. FIGS. 7A-B are side and top views of the lever 16 according to the illustrative embodiment. As illustrated gripping area 16B is characterized by rounded exterior surfaces to accommodate squeezing by the operator's fingers. Gripping area 16B may be formed out of plastic or other synthetic resins, as well as natural or synthetic rubber or combinations thereof, or any other suitable material that has a high enough coefficient of friction to ensure a secure grip while preventing fatigue to the operator's hand over prolonged periods. An aperture extends through handle end 14A to accommodate the tension cable of linkage system 26, as explained hereinafter. A second aperture extends through an intermediate portion of lever 16 to facilitate pivotal mounting of lever 16, to leg 14D of handle 14. As explained herein, counterpressure applied simultaneously to both handle 14 and lever 16 causes actuation of linkage system 26, thereby causing pincers 18 to converge forcing a corner bead resting within V-shaped frame 12 to become inwardly deformed into an exterior corner of drywall and thereby creating a frictional attachment to the drywall, without extra fastening devices.

Figure 10A:
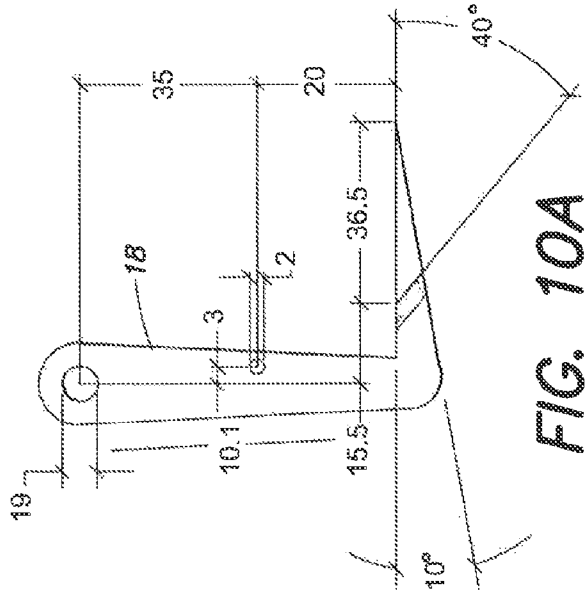
FIGS. 10A-C are side, front and top views of the pincer element of the apparatus of FIG. 1.
Figure 10B:
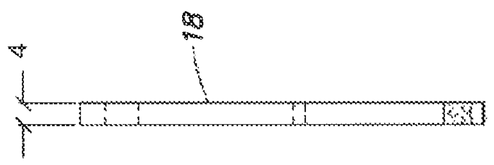
Figure 10C:
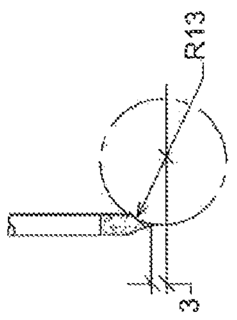

A pair of opposed pincers 18 having pointed tips 18A extending through apertures 12C within members 12A-B are movably coupled to frame 12 so as to allow the tips 18A to move in a converging direction, as illustrated in FIG. 2. FIGS. 10A-C are side, front and top views of pincers 18. Pincers 18 may be formed from grade 55 carbon steel or other materials having suitable rigidity. The non-pointed ends of the pincers are pivotally joined together at a point along the center support post 20. A spring 26 biases pincers 18 into an open or divergent configuration.

Figure 14:
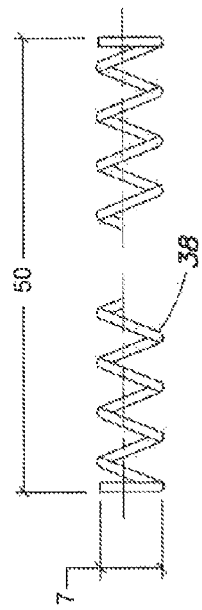

FIG. 14 is a side view of spring 26 which in the illustrative embodiment may be formed of heat treated spring steel and is coupled to pincers 18 via right angle ends, not shown, which extend through apertures in pincers 18. In the illustrative embodiment, spring 26 may be partially compressed with approximately 2-3 pounds off pressure applied thereto.

Linkage system 26 translates force applied to handle 14 and lever 16 into a converging motion forcing pincers 18 toward each other. Linkage system 26 comprises L-shaped members 28, pincer guides 30, extension arms 32, carriage 34, cable 36, coil spring 38, and miscellaneous connecting elements, such as screws, washers, etc. FIGS. 10A-14B illustrates various views of selected items of the linkage system 26 described herein.

Figure 8A:
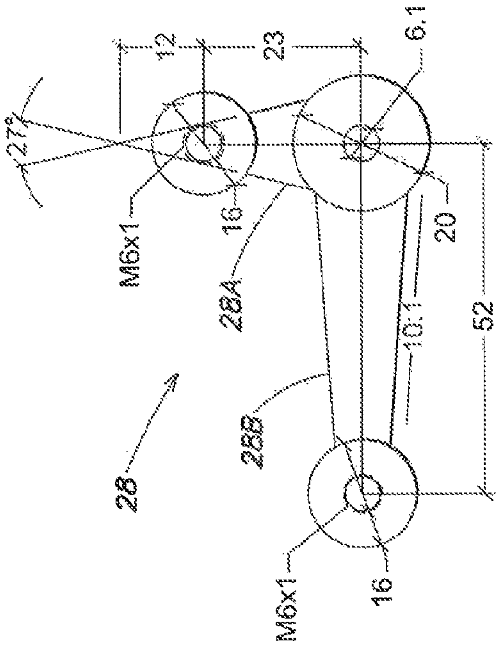
FIGS. 8A-B are side and top views of the L-shaped member of the linkage system of the apparatus of FIG. 1.
Figure 8B:
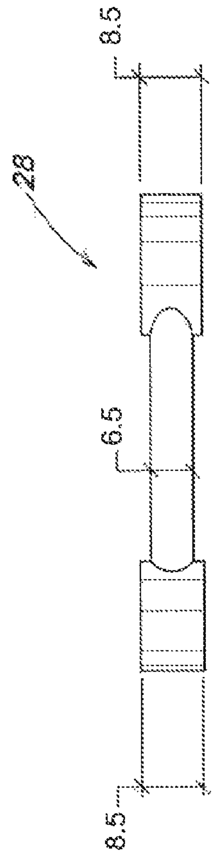
Figure 9A:
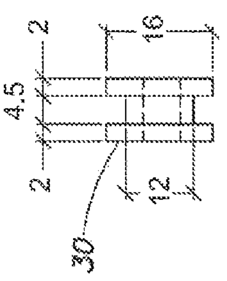
FIGS. 9A-B are side and top views of the urging elements intermediate the L-shaped linkage member and the pincer element of the apparatus of FIG. 1.
Figure 9B:
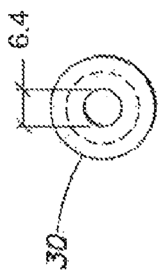

FIGS. 8A-B are side and top views, respectively, of the L-shaped members 28. L-shaped members 28 are pivotally mounted to each side support posts 22-24. In the illustrative embodiment, the short leg 28A of each L-shaped member is in contact with one of pincers 18 via a pincer guide 30 attached to the L-shaped member. FIGS. 9A-B are side and top views, respectively, of pincer guides 30.

Figure 11A:
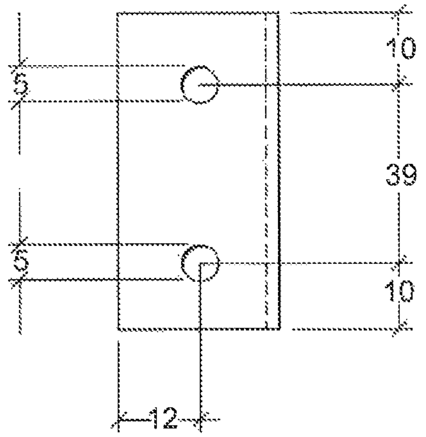
FIGS. 11A-14 are the various views of selected items of the linkage system of the apparatus of FIG. 1.
Figure 11B:
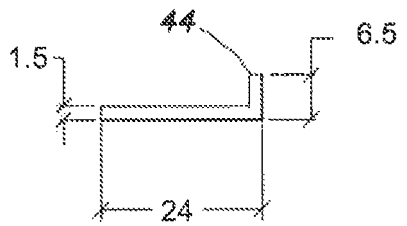
Figure 12A:
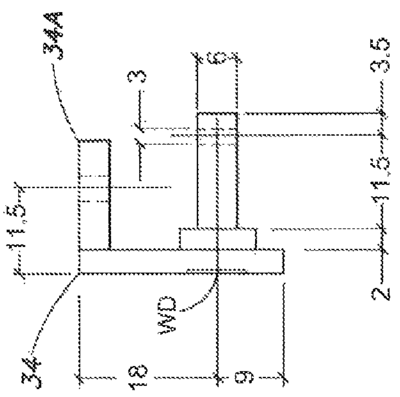
Figure 12B:
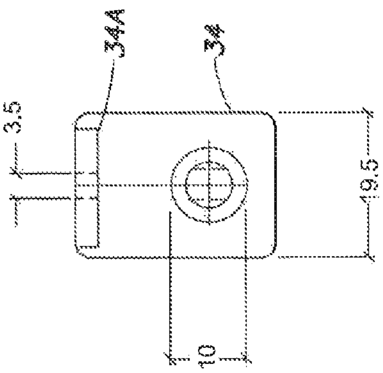
Figure 12C:
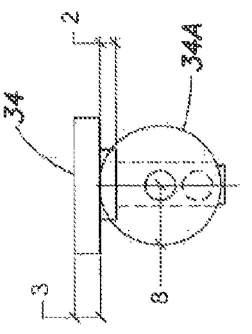

The longer leg 18B of each L-shaped member 28 is pivotally coupled to the first end 3A of one of the two extension arms 32. Extension arms 32 are pivotally coupled at their respective second ends 32B to carriage 34. Carriage 34 is slidably disposed within a track or groove 40 formed by a pair of plates 44 mounted to the top of center support post 20. FIGS. 11A-B are top and side views, respectively, of plate 44, which in the illustrative embodiment may be formed of heat treated spring steel and is coupled to the top end of center support post 20 via a fastening device, such as screws and bolts, etc. Each of plates 44 is mounted to the sides of center post 20 so that the lip thereof overlaps a grove of depression in center post 20 to define the channel into which carriage 34 is received and travels. A tab 34A extending from carriage 34 is secured to one end of a cable 36. FIGS. 12A-C are side, front and top views, respectively, of carriage 34 which in illustrative embodiment may be formed of grade 55 carbon steel or other suitably rigid material.

In the illustrative embodiment, the cable 36 is of a coaxial design with a movable multistrand wire core 36A extending through a semi-rigid tubular sheath 36B. An extreme end of the wire core 36A is attached to the carriage tab 34A, while the extreme end of the wire sheath 36B is coupled to the top of the center support post via plate 44.

Figure 13A:
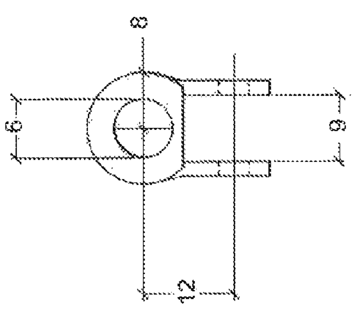
Figure 13B:
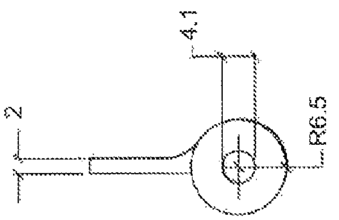

The second end of the cable 36 is pivotally secured to end 16B of lever 16. FIGS. 13A-B are side and top views, respectively, of cable fastener 46, which in the illustrative embodiment may be formed of heat treated spring steel and movably couples the second end of the cable 36 to end 16B. A cable tension adjustment element 48 is secured to one end of sheath 36, as illustrated in FIG. 1, which enables the amount of friction applied to wire core 36A to become rotatably adjusted. Coiled spring 38, which serves as a tensioning mechanism, is disposed about the unsheathed or exposed length of the wire core 36A to bias the wire/carriage away from the top of the center support post 20 and plate 44, and, therefore, biases the lever 16 into an open position. Together, spring 38 and tension adjustment element 48 collectively define the amount of force that must be applied to lever 16 in order to force pincers 18 to converge.

The apparatus described herein enables transmitting to the corner bead force applied to the frame 12 in a first direction, while deforming the corner bead with force applied to the lever 16 in a second direction, the second direction being substantially opposite the first direction. As such, one hand can provide the force in both the first and second directions.

In use, the operator places the handle 12 in the palm of his/her hand and squeezes the lever 16 with the fingers of the same hand. The force applied to the lever 16 causes the lever to pivot, thereby causing the wire core of the cable 36 to be at least partially retracted back into the exterior sheath. As the wire core is retracted, force is placed against the coiled spring 38, causing a controlled movement of the carriage mechanism 34 within the groove and towards the top of the center support post 20. As the carriage mechanism slides away from the V-shaped members 12A-B, force is transmitted through the extension members 32 which causes each of the respective L-shaped members 28 to pivot at their respective support posts, forcing their respective short legs to urge the pincers 18 in a converging direction into the interior of the V-shaped member.

To attach a corner bead to an exterior drywall corner, the corner bead is disposed with the V-shaped member of the apparatus and the lever actuated so that the converging pincers, particularly the pointed ends thereof, deform the corner bead and force portions of the corner bead into the drywall, thereby frictionally engaging the corner bead to the drywall surfaces at opposing pairs of locations. Repeated use of the apparatus allows the corner beads to be mechanically secured, without additional fastening devices or adhesives, at multiple locations simply by repositioning the apparatus along the corner bead and actuating the lever handle. The apparatus of the present invention may be used with numerous commercially available corner bead designs that are formed of any soft metal, such as tin or other malleable materials. Note that no actual arrangement of apertures within the flanges of the corner bead are required since the apparatus described herein catches the corner bead through deformation and not attachment elements such as screws, nails, staples, etc.

FIGS. 15-24B illustrate a second embodiment of a fastening apparatus according to the present invention. The construction and function of fastening apparatus 110 is generally similar to that of apparatus 10 described herein with some exceptions. The fastening apparatus 110 of the second illustrative embodiment comprises a V-shaped frame 112, a handle 114, a lever 116, a pair of opposed pincers 118, and linkage system 126, configured as illustrated. In the illustrative second embodiment, a portion of handle 114 may be integrally formed with frame 112, as explained hereinafter. Unless otherwise noted, any of items 112-118 may be made from precision cast aluminum.

FIGS. 17-18 and 20A-B illustrate various views of V-shape frame 112. V-shaped frame 112 is defined by flat members 112A-B and center post 120. Flat members 112A-B are joined to define a V-shaped interior whose surfaces may be disposed at an angle similar to frame 12 of apparatus 10, described above. Frame 112 may be formed integrally from precision cast aluminum or other materials having suitable rigidity. Alternatively, frame 112 may be manufactured from the plurality of components attached together.

Figure 22A:
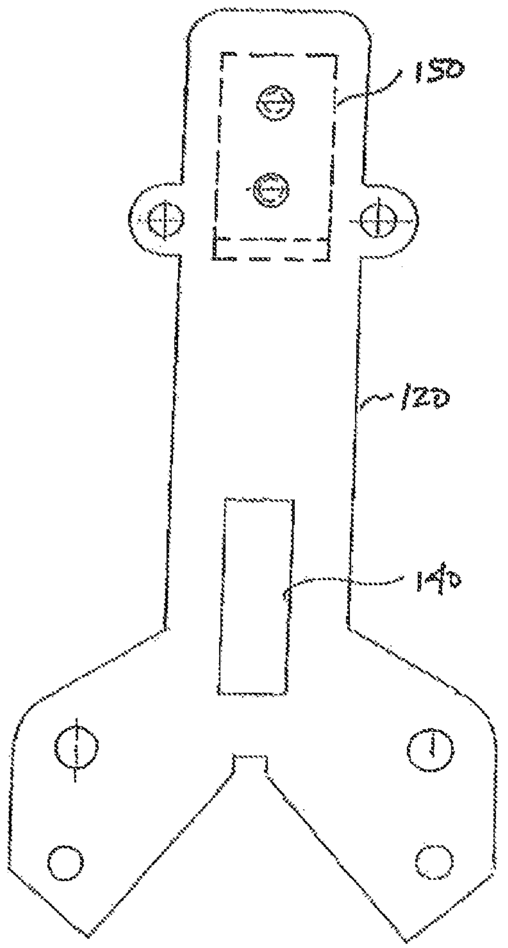
FIGS. 22A-B are front and side views of the center support member of the apparatus of FIG. 15.
Figure 22B:
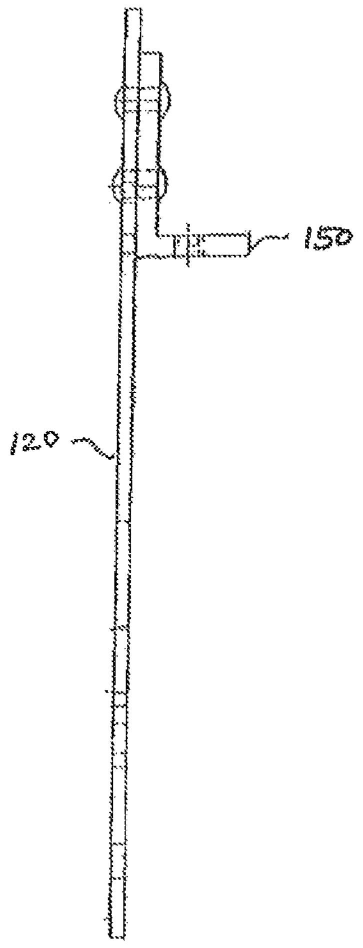
Figure 23A:
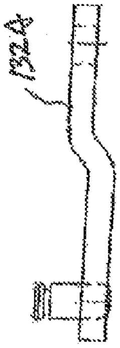
FIGS. 23A-D are side and top views of the extension arms of the linkage mechanism of the apparatus of FIG. 15.
Figure 23B:
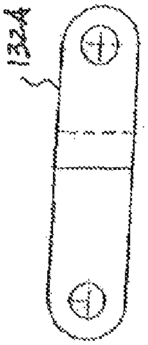
Figure 23C:
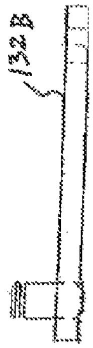
Figure 23D:
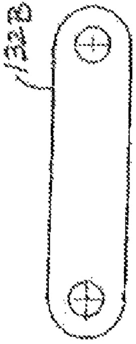

FIGS. 22A-B are front and side views of center post 120. In the illustrative embodiment, center support post 120 is secured adjacent members 112A-B and angle component 114B, and may be formed from precision cast aluminum or other materials having suitable rigidity, along with the other elements comprising frame 112.

Figure 18:
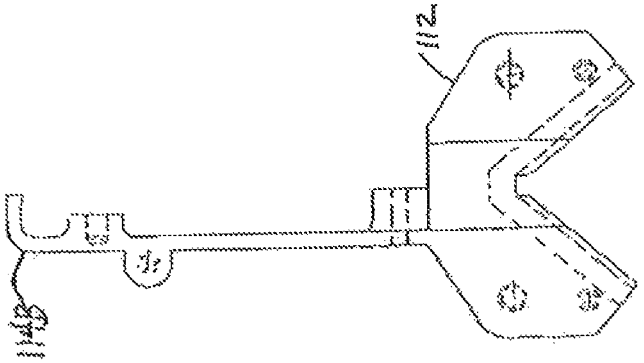
FIG. 18 is a front view of the frame of FIG. 17.
Figure 20A:
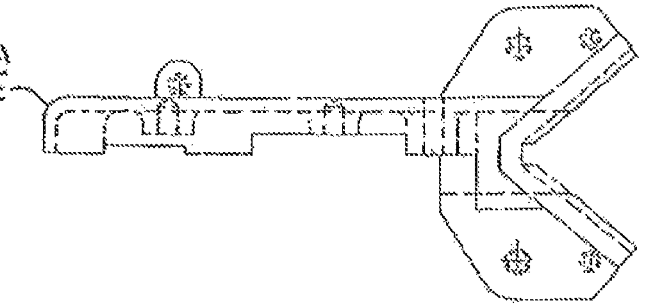
FIGS. 20A-B are front and top views of the frame of the fastening apparatus of FIG. 15.
Figure 19B:
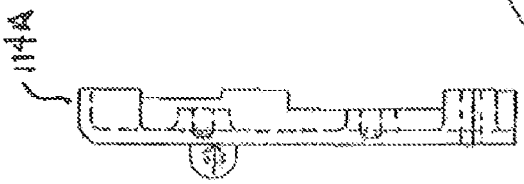
FIGS. 19A-B are side and front views of the handle of the fastening apparatus of FIG. 15.
Figure 20B:
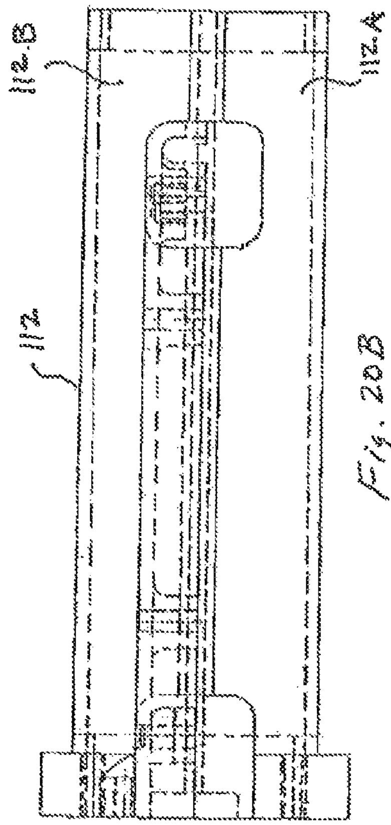
Figure 19A:
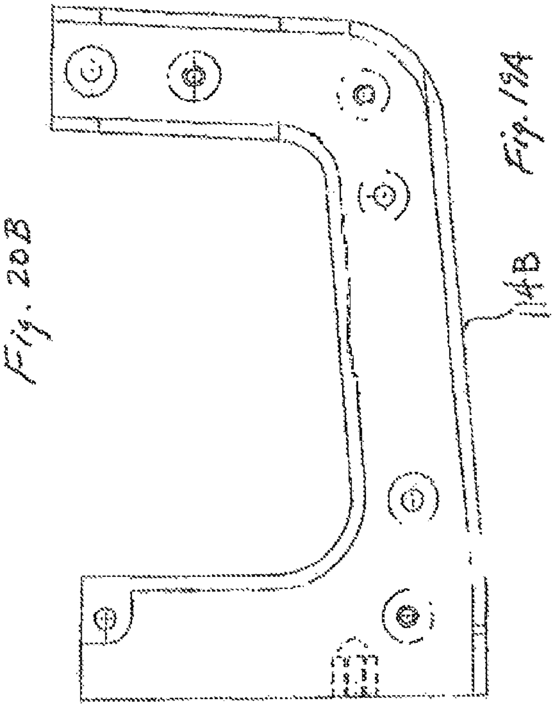

Handle 114 has a generally inverted U-shape, and, in the second illustrative embodiment, is formed from complementary mating halves 114A-B, illustrated with FIGS. 18, 19A-B and 20A. In the illustrative embodiment, half handle 114B is integrally formed with frame 112, as illustrated in FIGS. 18 and 20A. Handle 114 may have a rounded end and a gripping area to accommodate grasping or placement within the palm of the operator's hand. A pair of apertures extends through handle right halves 114A-B into which rollers 146 are journaled via axles 148 to accommodate and tension cable 136 of linkage system 126, as explained hereinafter. A third aperture extends through at least one of handle halves 114A-B to facilitate pivotal mounting of lever 116.

Figures 21A, 21B, 21C:
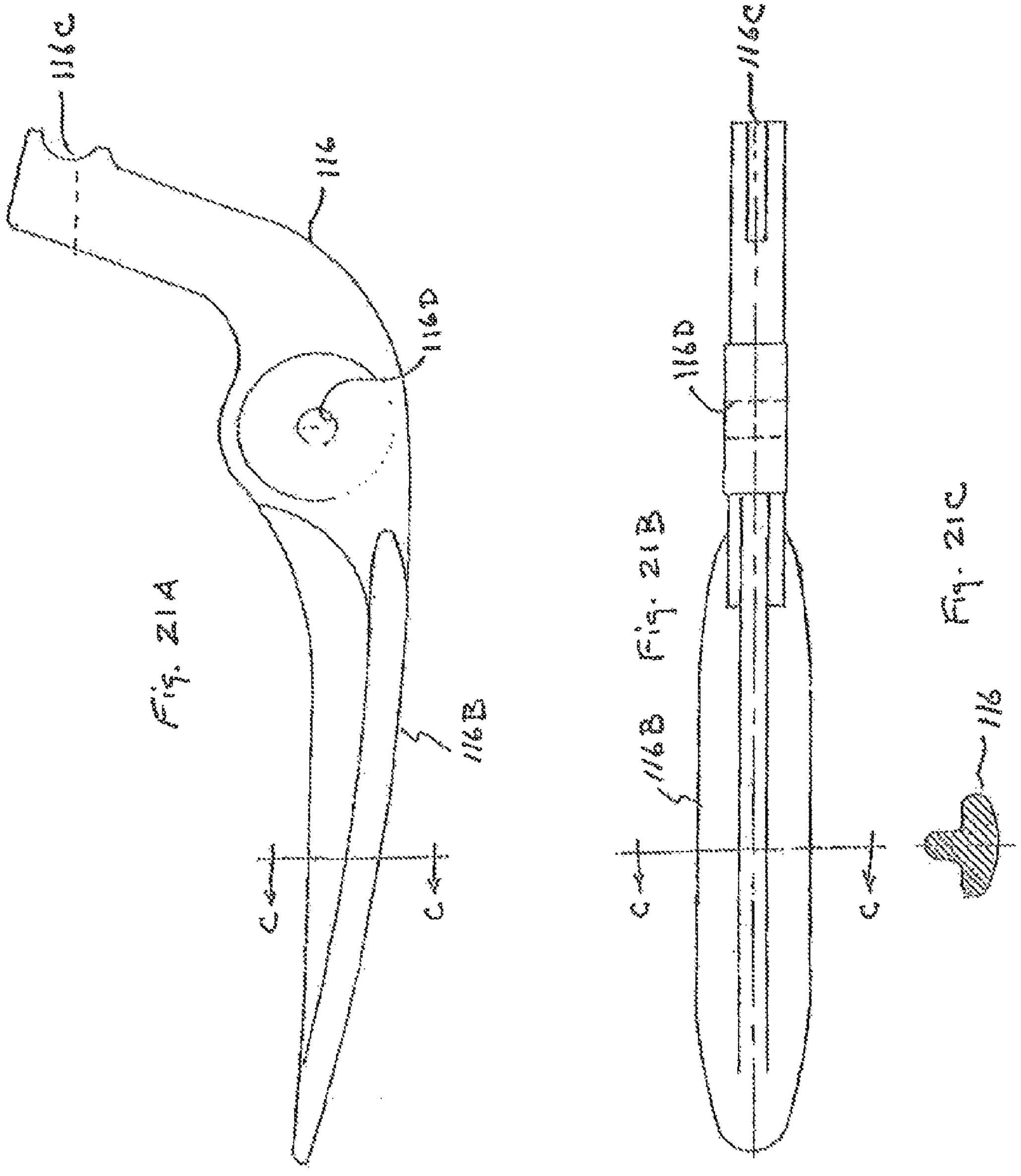
FIGS. 21A-B are side and top views of the lever of the fastening apparatus of FIG. 15.
FIG. 21C is a cross-sectional view of the lever of the FIGS. 21A-B taken along lines C-C thereof.

Lever 116 is pivotally coupled to handle 114. Lever 116 also defines an elongated gripping area 116B. FIGS. 21A-C are side, top and cross-sectional views, respectively, of the lever 116 according to the second illustrative embodiment. As illustrated, gripping area 116B is characterized by rounded exterior surfaces to accommodate squeezing by the operator's fingers. A slot 116C is disposed at an end of lever 116 to accommodate securing of tension cable 136 of linkage system 126. An aperture 116D extends through an intermediate portion of lever 116 to facilitate pivotal mounting of lever 116 to handle 114. As explained herein, counterpressure applied simultaneously to both handle 114 and lever 116 causes actuation of linkage system 126, thereby causing pincers 118 to converge forcing a corner bead resting within V-shaped frame 112 to become inwardly deformed into an exterior corner of drywall and thereby creating a frictional attachment to the drywall, without extra fastening devices.

Figure 16:
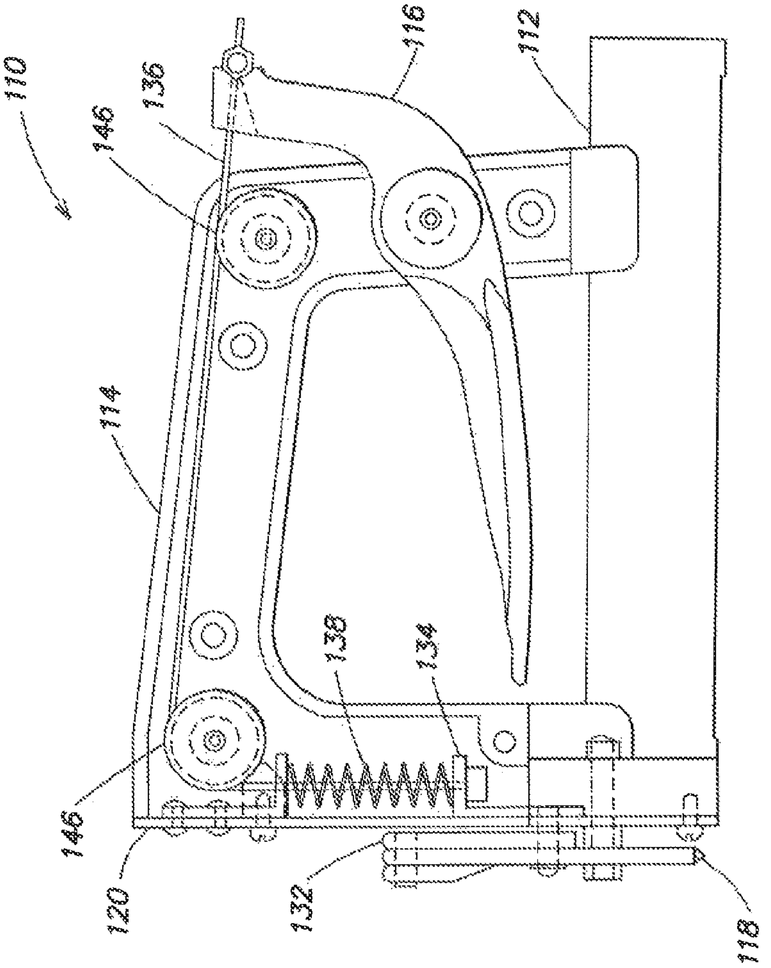
FIG. 16 is a front end, cut-away view of the fastening apparatus of FIG. 15 with a more converged position of pincers 118 illustrated in phantom.
Figure 24A:
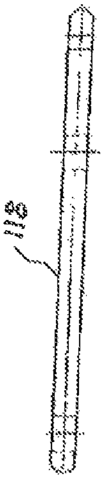
FIGS. 24A-B are side and top views of the pincer element of the apparatus of FIG. 15.
Figure 24B:

A pair of opposed pincers 118 having pointed tips 118A are disposed exterior of members 112A-B and are movably coupled to center support post 120 so as to allow the tips 118A to move in a converging direction, as illustrated in FIG. 16. FIGS. 24A-B are top and side views of pincers 118. Pincers 118 may be formed from grade 55 carbon steel or other materials having suitable rigidity. A point along each of the pincers 118 is pivotally attached at a point along center support post 120, as illustrated.

Figure 15:
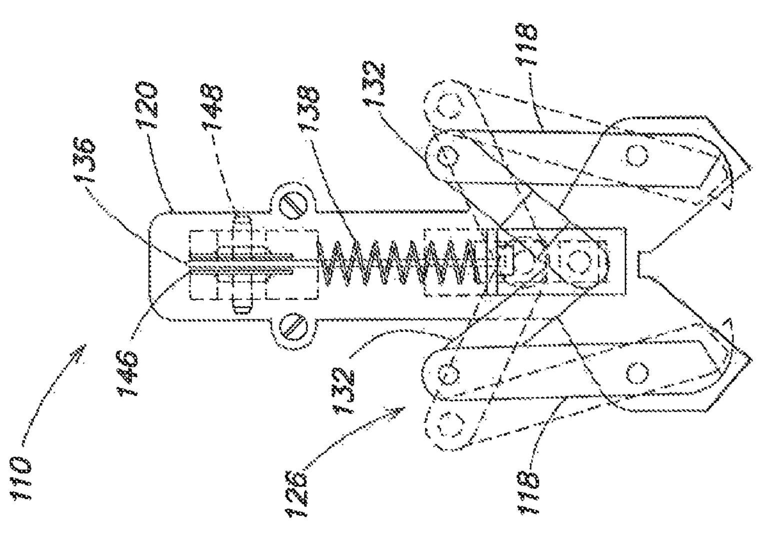
FIG. 15 is a side, cut-away view of a second embodiment of a fastening apparatus according to the present invention.
Figure 17:
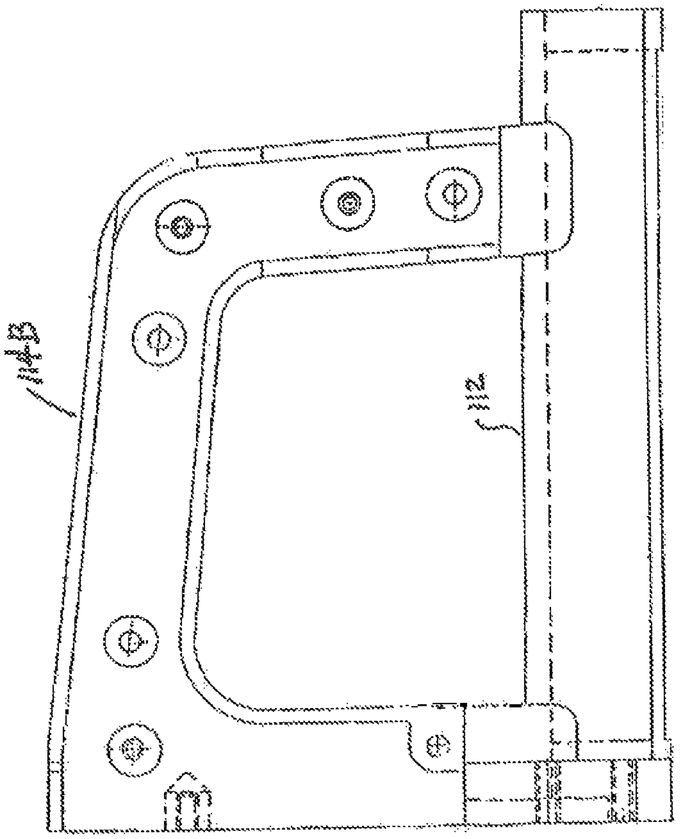
FIG. 17 is a side view of the frame and handle of the fastening apparatus of FIG. 15.

Linkage system 126 translates force applied to handle 114 and lever 116 into a converging motion forcing pincers 118 toward each other. Linkage system 126 comprises extension arms 132, carriage 134, cable 136, coil spring 138, stop 150 and miscellaneous connecting elements, such as screws, washers, etc. FIGS. 15-16 illustrate various views of selected items of the linkage system 126, which is described herein.

Extension arms 132 are pivotally coupled at their respective first ends to one of each of pincers 118. Extension arms 132 are pivotally coupled at their respective second ends to carriage 134. Carriage 134 is slidably disposed within a track or groove 140 formed in center support post 120. FIGS. 22A-B are top and side views, respectively, of stop 150, which in the illustrative embodiment may be formed of heat treated spring steel and is coupled to the top end of center support post 120 via a fastening device, such as more a screws and bolts, etc. Cable 136 passes through stop 150 which also serves to limit the compression of spring 138 during actuation of linkage system 126.

In the illustrative embodiment, cable 136 may be of a design similar to cable 36 of apparatus 10. An extreme end of the wire core 136 is attached to the carriage 134 and passes through stop 150 and over rollers 146. The second end of the cable 136 is secured to slot 116C of lever 116.

Coiled spring 138, which serves as a tensioning mechanism, is disposed about a length of the wire core 136 to bias the wire/carriage away from the top of the center support post 120 and stop 150, and, therefore, biases the lever 116 into an open position. Spring 138 collectively defines the amount of force that must be applied to lever 116 in order to force pincers 118 to converge. In the illustrative embodiment, spring 138 may be partially compressed with a force in excess of approximately 2-3 pounds off pressure applied thereto.

In an embodiment, the arrangement of elements comprising linkage system 126 is illustrated in FIGS. 15-16. FIG. 16 is a front end, cut-away view of the fastening apparatus of FIG. 15 illustrating the relationship between cable 136, carriage 134 and pincers 118. When lever 116 is biased into its resting or first position, cable 136 allows carriage 134 to rest at its lowest position on center support 120, as illustrated in FIG. 16. As tension is applied to lever 116, cable 136 is pulled forcing carriage member 134 into an upward motion relative center support 120 that is controlled by the compression of spring 138. As carriage 134 rises, the V-shaped angle formed between linkage arms 132 in their at rest position begins to increase, forcing pincers 118 to pivot at their respective points of attachment to center support 120 from their at rest position, shown in solid lines in FIG. 16, to a more converged position, illustrated in phantom in FIG. 16.

In use, the operator places the handle in the palm of his/her hand and squeezes the lever with the fingers of the same hand. The force applied to the lever 116 causes cable 136 to be pulled. As the wire is pulled, force is placed against the coiled spring 138 causing a controlled movement of the carriage mechanism 134 towards the top of the center support post 120. As the carriage mechanism slides away from the V-shaped members 112A-B, force is transmitted through the extension arms 132, which causes each of the pincers 118 to pivot at their respective points of attachment to support post 120 and urging the pincers in a converging direction into the interior of the V-shaped member.

Figure 25:
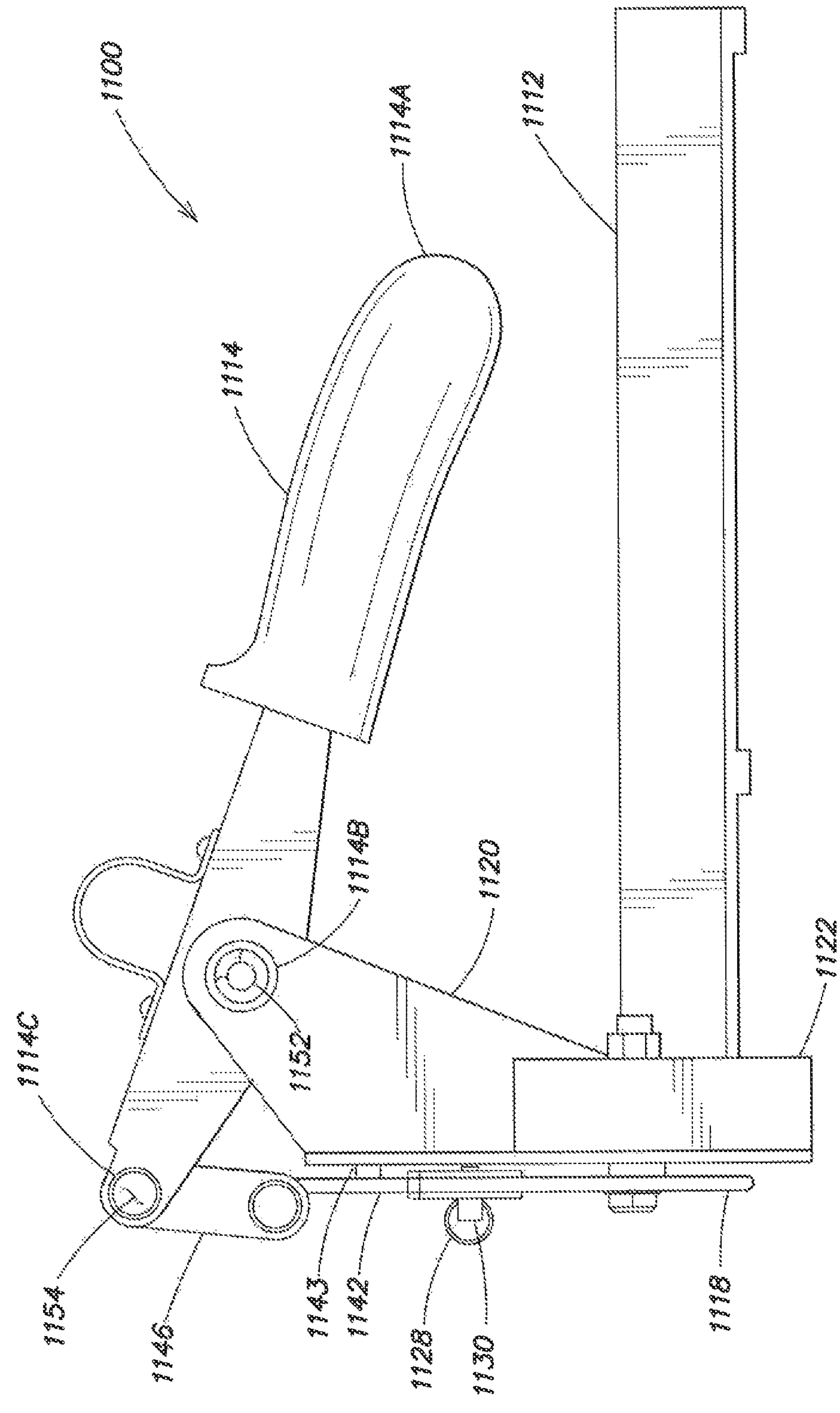
FIG. 25 is a side view of an exemplary embodiment of a fastening apparatus.
Figure 26:
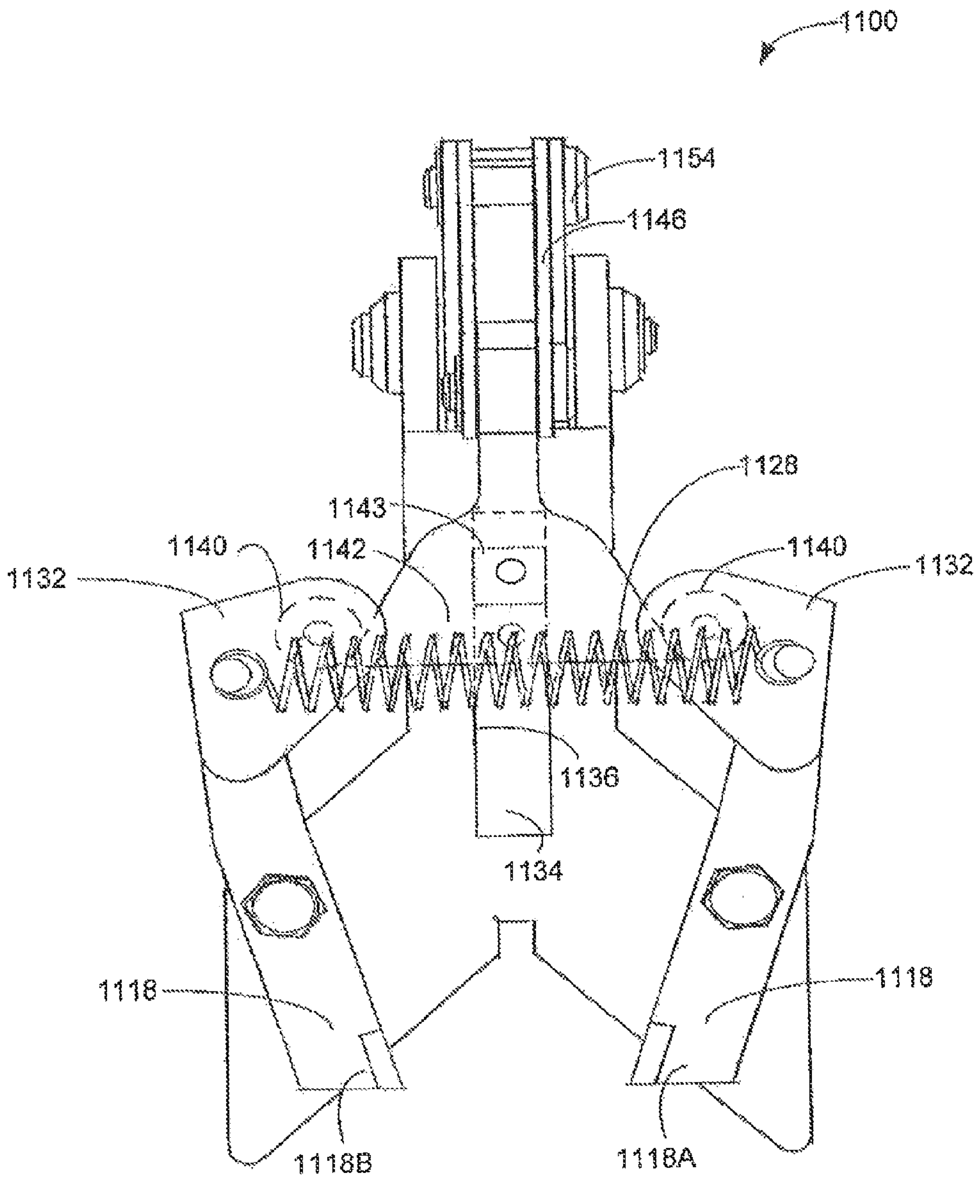
FIG. 26 is a front view of the fastening apparatus of FIG. 25.

Referring now to FIGS. 25 and 26, side and front views of another exemplary embodiment of the present disclosure are shown. In this embodiment, a fastening apparatus 1100 comprises a V-shaped frame 1112, a handle 1114 coupled to the frame 1112, and a pair of opposed pincers 1118, support posts 1120-1124, and a linkage system 1126 mechanically coupling the pincers 1118 to the handle 1114, are configured as illustrated. FIG. 25 is a side view of the fastening apparatus 1100 of the present embodiment, while FIG. 26 is a front end view of the fastening apparatus 1100.

Figure 27:
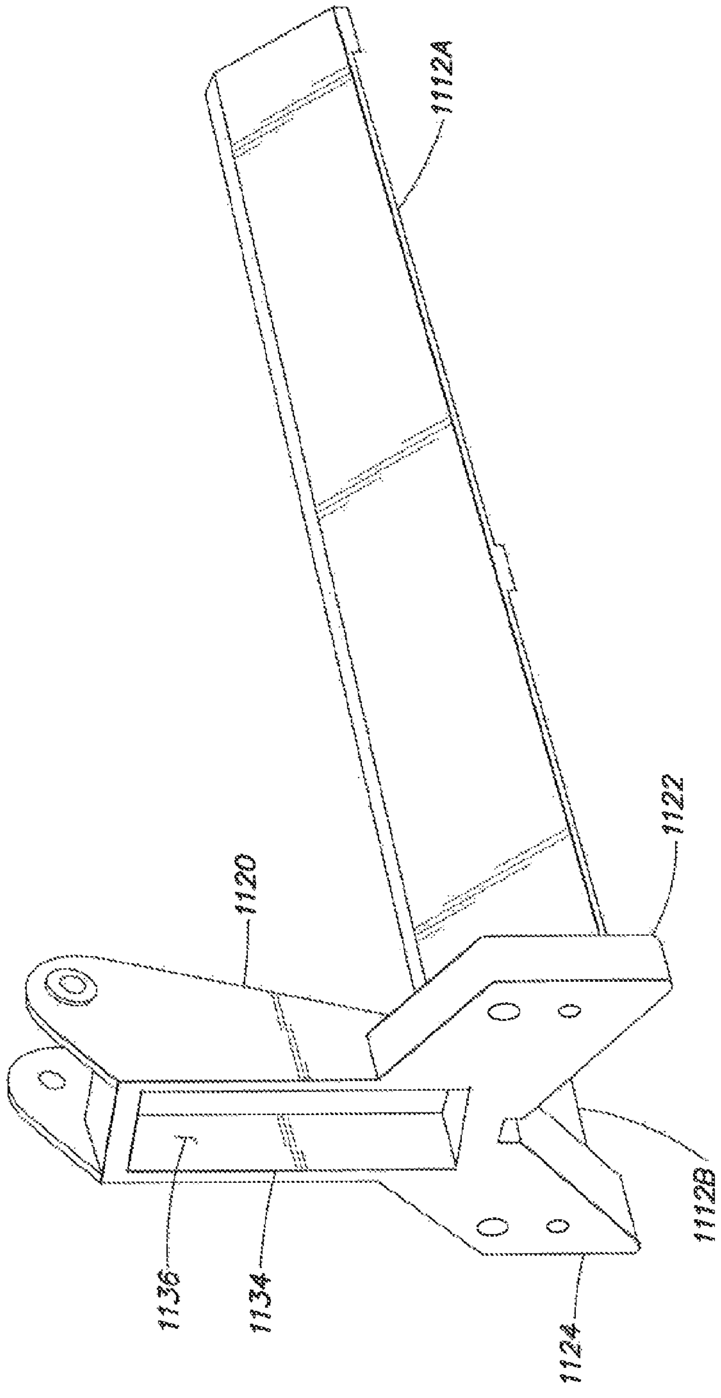
FIG. 27 is a perspective view of a V-shape frame and support posts.

Referring also to FIG. 27, a perspective view of the V-shape frame 1112 and the support posts 1120-1124 is shown. V-shaped frame 1112 is defined by a pair of flat members 1112A-B integrally formed to define a V-shaped interior whose surfaces are disposed at an angle of less than 100° from each other. The apex of the angle defines a partial cylindrical portion of approximately greater than 180°. Note that the partial cylindrical portion may extend along all or a portion of members 1112A-B. Frame 1112 may be designed to receive a standard corner bead so that the bead flanges rest against members 1112A-B. In the illustrative embodiment, members 1112A-B have a generally rectangular shape which extends the length of frame 1112. However, in other embodiments, members 1112A-B may be shortened to a length that is adequate to receive the corner bead flanges therein. Also, the interior surface angle defined by members 1112A-B may be greater than 100° if adequate adaptors are disposed therein to form an angle that is adequate for receiving the corner bead. For example, an interior angle of 110° formed by members 1112A-B may be effectively narrowed by attaching wedge-shaped adapters to the interior surfaces of members 1112A-B so that the effective interior angle is 80°, for example. As noted, frame 1112 may be formed integrally from precision cast aluminum or other materials having suitable rigidity. In other embodiments, frame 1112 may be manufactured from the plurality of components attached together. In yet another embodiment, members 1112A-B may be pivotally joined at their apex so as to adapt to variations in corner bead designs.

As illustrated, center support post 1120 is disposed opposite the apex of the interior angle formed by members 1112A-B, while side support posts 1122-1124 are disposed on the exterior surface of one of the respective frame members 1112A-B. Support posts 1120-1124 may be formed integrally from precision cast aluminum or other materials having suitable rigidity, along with the other elements comprising frame 112. In other embodiments, one or more of support posts 1120-1124 and the frame 1112 may be manufactured from separate components attached together, for example, welded steel components.

The center support post 1120 is configured to accommodate a coupling member 1152, including but not limited to a screw or a bolt, that pivotally couples the handle 1114 to the center support post 1120. In addition, the center support post 1120 defines a channel 1134, whose edges may act as a guide that can restrict the movement of the pincers 1118, as will be described below.

Handle 1114 has a rounded end 1114A on one end, a first coupling aperture 114B for coupling the handle 1114 to the center support post 1120 via the coupling member 1152, and a second coupling aperture 1114C on the opposite end for coupling the handle 1114 to a linkage system 1126 for controlling the movement of the pair of pincers 1118.

The pair of opposed pincers 1118 having pointed tips 1118A-B are movably coupled to the frame 1112 so as to allow the tips 1118A-B to move in a converging motion. Pincers 1118 may be formed from carbon steel or other materials having suitable rigidity. In some embodiments, the pincers 1118 are mounted to respective ends of the support posts 1122-1124.

A spring 1128 coupled to the pincers 1118 biases the pincers 1118 into a divergent configuration in which the pointed tips 1118A-B of the pincers 1118 are farthest from one another. The spring 1128 which, in the illustrative embodiment, may be formed of heat treated spring steel and is coupled to pincers 1118 via right angle ends 1130, which extend through apertures in pincers 1118. In the illustrative embodiment, spring 1128 may be partially compressed with approximately 2-3 pounds of pressure applied thereto.

The linkage system 1126 comprises a coupling member 1146, a delta shaped spreader 1142, and a member 1143, having a complementary shape to the channel 1134, coupled to the spreader 1142. The member 1143 can travel within the channel 1134 defined by the center support post 1120. The coupling member 1146 couples the handle 1114 to the spreader 1142 such that when a force is applied to the handle 1114, the coupling member 1146 causes the spreader 1142 and the member 1143 to move oppositely, thereby causing pincers 1118 to converge forcing a corner bead resting within V-shaped frame 1112 to become inwardly deformed into an exterior corner of drywall and thereby creating a frictional attachment to the drywall, without extra fastening devices. The force applied to the handle 1114 has to exceed the resistive force imparted by the spring 1126 for the spreader 1142 to move towards the convergent position.

The delta-shaped spreader 1142 has tapered sides that slide along a pair of pulleys 1140. The pulleys 1140 are operatively coupled to the pincers, such that when a force is applied to the handle 114 causing the delta-shaped spreader 1142 to move from a first position to a second position, the pincers 1118 move from the divergent position to the convergent position. In some embodiments, a bracket 1132 couples the pulleys 1140 to the pincers such that when the pincers move between the divergent and convergent positions, the pulleys 1140 also move.

The delta-shaped spreader 1142 is biased towards a first position by the pulleys 1140, which impart the force imparted by the spring 1128 on the pincers. In various embodiments, the extent to which the pincers 1118 diverge from one another or converge towards one another may be influenced by the movement of the member 1143 within the channel 1134 and the exterior side profile of the spreaders.

In various embodiments, the length of the channel can define the range of positions to which the pincers can extend. When the member 1143 contacts an upper end of the channel 1134, both illustrated in phantom in FIG. 26, the pincers 1118 are at a maximum convergent position, and when the member 1143 contacts a lower end of the channel 1134, the pincers 1118 are at a maximum divergent position. It should also be noted that when the member 1143 contacts an upper end of the channel 1134, the pulleys are imparting the spring biasing force on the spreader 1142 near a narrow portion of the delta-shaped spreader 1142.

As sufficient force is exerted on the handle 114, causing the spreader 1142 and the member 1143 to move towards the upper end of the channel 1134, the pulleys 1140 continue to impart the spring biasing force on the spreader 1142. Once the member 1143 reaches the upper end of the channel 1134, the pulleys 1140 continue to impart the spring biasing force near the widest portion of the delta-shaped spreader 1142. Since the pulleys contact the spreader 1142 to impart the biasing force, the relative size of the spreader 1142 and the channel 1134 may be configured so that the movement of the spreader 1142 is restricted to areas where the pulleys 1140 are always in contact with the spreader 1142. It should be appreciated that other means, including but not limited to stoppers or non-rotating posts, for restricting the movement of the spreader 1142 may be implemented.

Referring now to FIGS. 28-32, side and front views of another exemplary embodiment of the present disclosure are shown. In this embodiment, a fastening apparatus 2000 comprises a V-shaped frame 2100, a support post 2200, a force exertion mechanism 2400, and a stapler unit 2500. Support post 2200 may comprise a front plate 2300, which may be integrally formed with support post or separately manufactured as an independent component. In some embodiments, support post 2200 may be considered as a portion of force exertion mechanism 2400. Unless otherwise noted, elements 2100-2500 are manufactured from precision cast aluminum or other materials having suitable rigidity.

Figure 28:
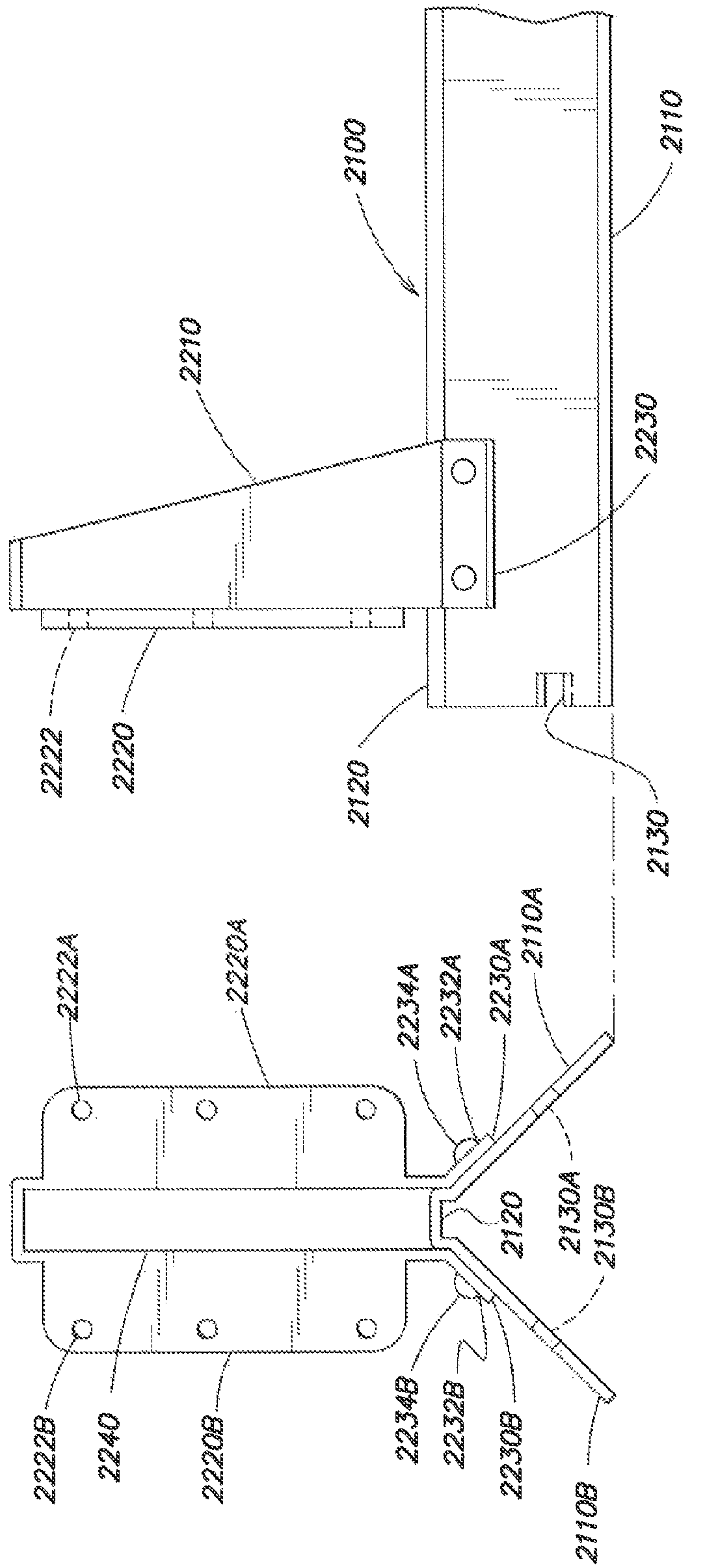
FIGS. 28-30 illustrate front and side views of a partially constructed fastening apparatus in accordance with another exemplary embodiment of the present invention.

Referring to FIG. 28, front and side views of V-shape frame 2100 and support post 2200 are shown. V-shaped frame 2100 is defined by a pair of flat contact members 2110 integrally formed to define a V-shaped interior whose surfaces are disposed at an angle of less than 100° from each other. In this embodiment, V-shaped frame 2100 may be manufactured by pressing a sheet metal into a right member 2110A and a left member 2110B, with the apex of the angle defining a rectangular protrusion 2120 as a ridge of frame 2100. In one embodiment, rectangular protrusion 2120 is formed to have a size and/or shape comparable to the corner edge of a corner bead, such that the corner bead may better engage with the V-shaped frame 2100, when the apparatus of the present invention is used to fasten the corner bead to a drywall. In other embodiments, the apex of the angle may be a cylindrical portion of approximately greater than 180°. Note that rectangular protrusion 2120 may extend along all or a portion of V-shaped frame 2100.

Frame 2100 may be designed to receive a standard corner bead so that the bead flanges rest against right and left members 2110A-B. In this illustrative embodiment, members 2110A-B have a generally rectangular shape which extends the length of frame 2100. However, in other embodiments, members 2110A-B may be shortened to a length that is adequate to receive the corner bead flanges therein. Also, the interior surface angle defined by members 2110A-B may be greater than 100°, if adequate adaptors are disposed therein to form an angle that is adequate for receiving the corner bead. For example, an interior angle of 110° formed by members 2110A-B may be effectively narrowed by attaching wedge-shaped adapters to the interior surfaces of members 2110A-B so that the effective interior angle is 80°, for example. As noted, frame 1112 may be formed integrally from precision cast aluminum or other materials having suitable rigidity. In other embodiments, frame 2100 may be manufactured from the plurality of components attached together. In yet another embodiment, members 2110A-B may be pivotally joined at their apex so as to adapt to variations in corner bead designs.

Frame 2100 may include a release opening 2130 for allowing staples to be released from stapler unit 2500. In this embodiment, two openings 2130A-B are respectfully formed in the form of a notch at one end of right and left members 2110A-B. It is noted that openings 2130A-B may be formed in the form of an aperture at any appropriate positions on right and left members 2110A-B.

As shown in FIG. 28, support post 2200 is disposed on frame 2100. Support post includes a central post 2210, a fixture base 2220 formed at a front portion of central post 2210, and a leg 2230 formed at a bottom portion of central post 2210. In this embodiment, fixture base 2220 comprises a right plate 2220A and a left plate 2220B, which respectively include right apertures 2222A and left apertures 2222B. In addition, fixture base 2220 defines a flat surface facing one end of V-shaped member 2100, so as to allow force exertion mechanism 2400 to be disposed thereon.

Leg 2230 comprises a right leg 2230A and left leg 2230B, which may form an angle that is substantially the same as the angle of V-shaped frame 2100. Right and left legs 2230A-B respectively include apertures 2232A and 2232B. Support post 2200 is securely fastened to frame 2100 by using coupling members 2234A-B through apertures 2232A-B. Note that coupling members 2234A-B may be screws, bolts, or any other suitable fastening device. In this embodiment, a rectangular opening 2240 is defined in support post 2200 between right and left plates 2220A-B, such that legs 2230A-B are separated by a width of the rectangular opening 2240. Further, the width of rectangular opening 2240 may be configured to be substantially equal to a width of rectangular protrusion 2120, such that support post 2200 may conform to the outer contour of frame 2100 when secured fastened to frame 2100. Components of support post 2200 may be formed integrally from precision cast aluminum or other materials having suitable rigidity. In this embodiment, support post 2200 and frame 2100 are manufactured as separate components and then attached to together. It is noted that support post 2200 may be formed integrally with frame 2100.

Figure 29:
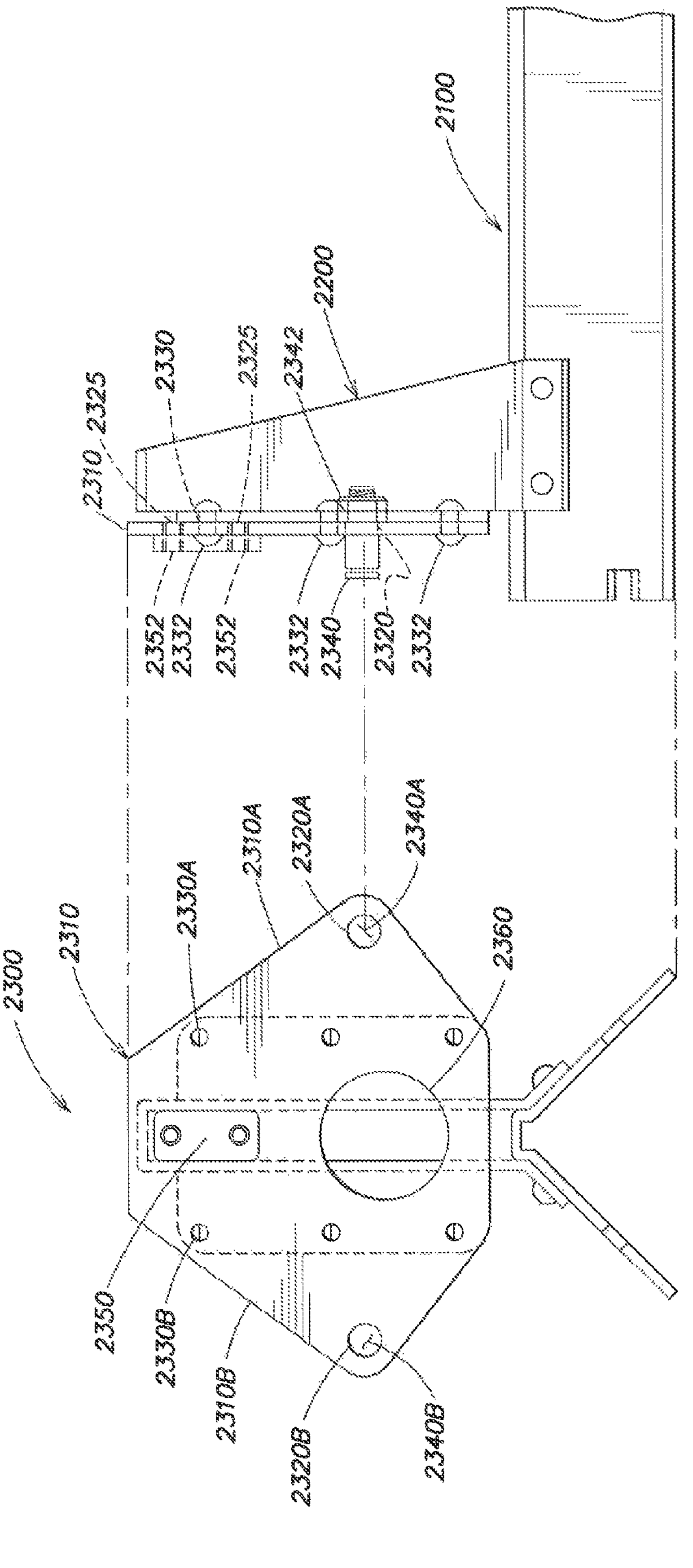

Referring to FIG. 29, front and side views of V-shape frame 2100 and support post 2200 including a front plate 2300 are shown. It is noted that front plate 2300 may be integrally formed with support post 2200 or separately formed as an independent component. In this embodiment, front plate 2300 is separately formed as an independent component. Further, front plate 2300 may have a substantially hexagonal shape, with a substantially triangular portion 2310A proximate right plate 2220A and a substantially triangular portion 2310B proximate left plate 2220B.

Front plate 2300 may include a primary body 2310, a pivotal hinge 2340, and a slider guide 2350. In this embodiment, a pair of hinge apertures 2320, a plurality of guide apertures 2325, and a plurality of fixture apertures 2330 are defined on primary body 2310. Hinge apertures 2320 may be defined near the vertices of triangular portions 2310A-B of primary body 2310, while fixture apertures 2330 may be defined along the bases of triangular portions 2310A-B of primary body 2310. Moreover, guide apertures 2325 may be defined at the upper central portion of primary body 2310. In one embodiment, front plate 2300 may further include an opening 2360 for appropriate purposes.

In this embodiment, pivotal hinge 2340 includes a right hinge 2340A and a left hinge 2340B, which are respectively fastened to primary body 2310 through hinge apertures 2320A and 2320B, using appropriate fastening devices 2342, such as screws, nuts and bolts, rivets or riveting elements, etc. In this embodiment, slider guide 2350 is securely fastened to primary body 2310 through guide apertures 2325 by using appropriate fastening devices 2352. Front plate 2300 may be securely fastened to fixture base 2220 of support post 2200 through fixture apertures 2330 and apertures 2222 by using appropriate fastening devices 2332, such as screws, bolts, etc.

Figure 30:
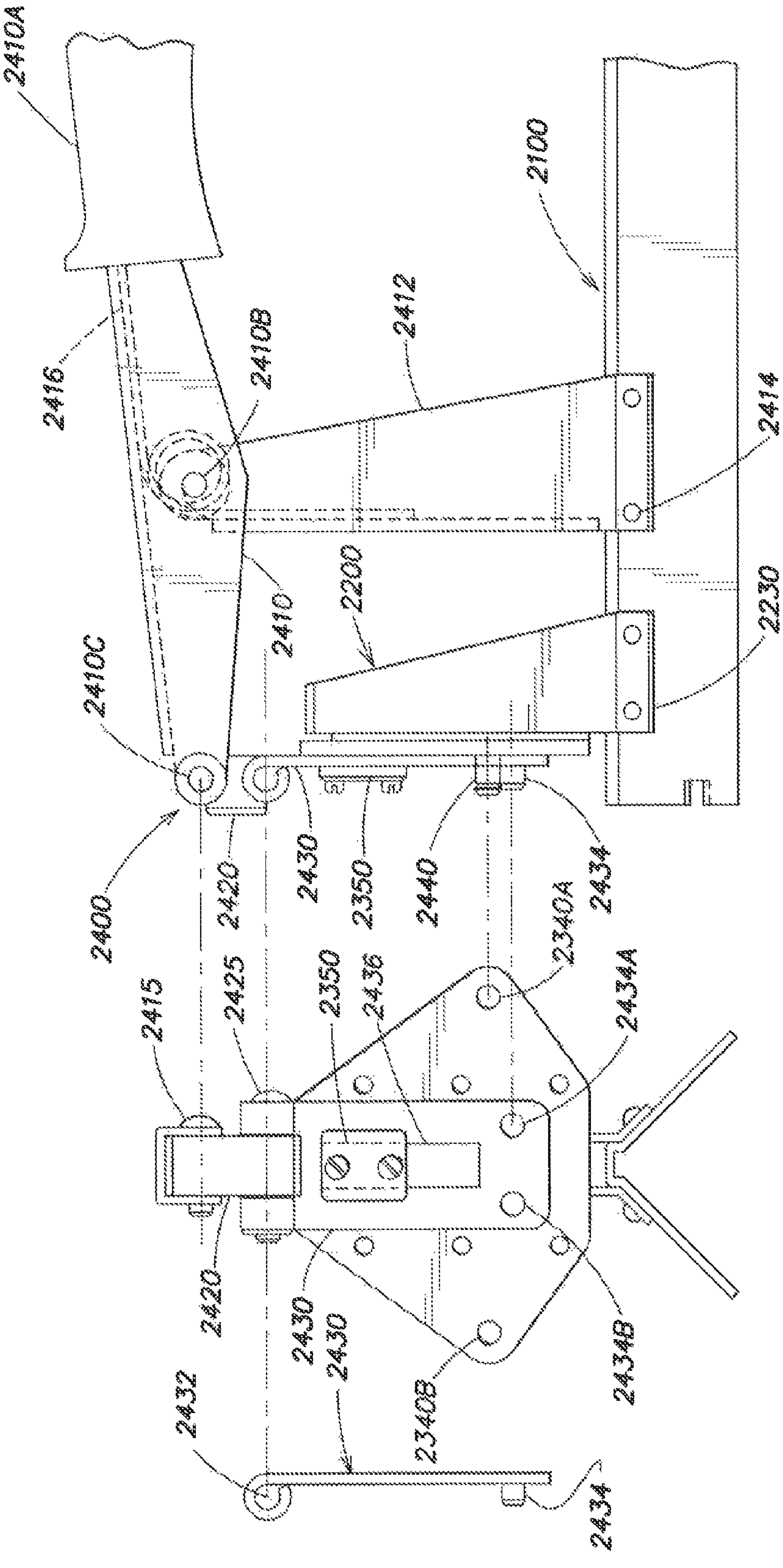
Figure 31:
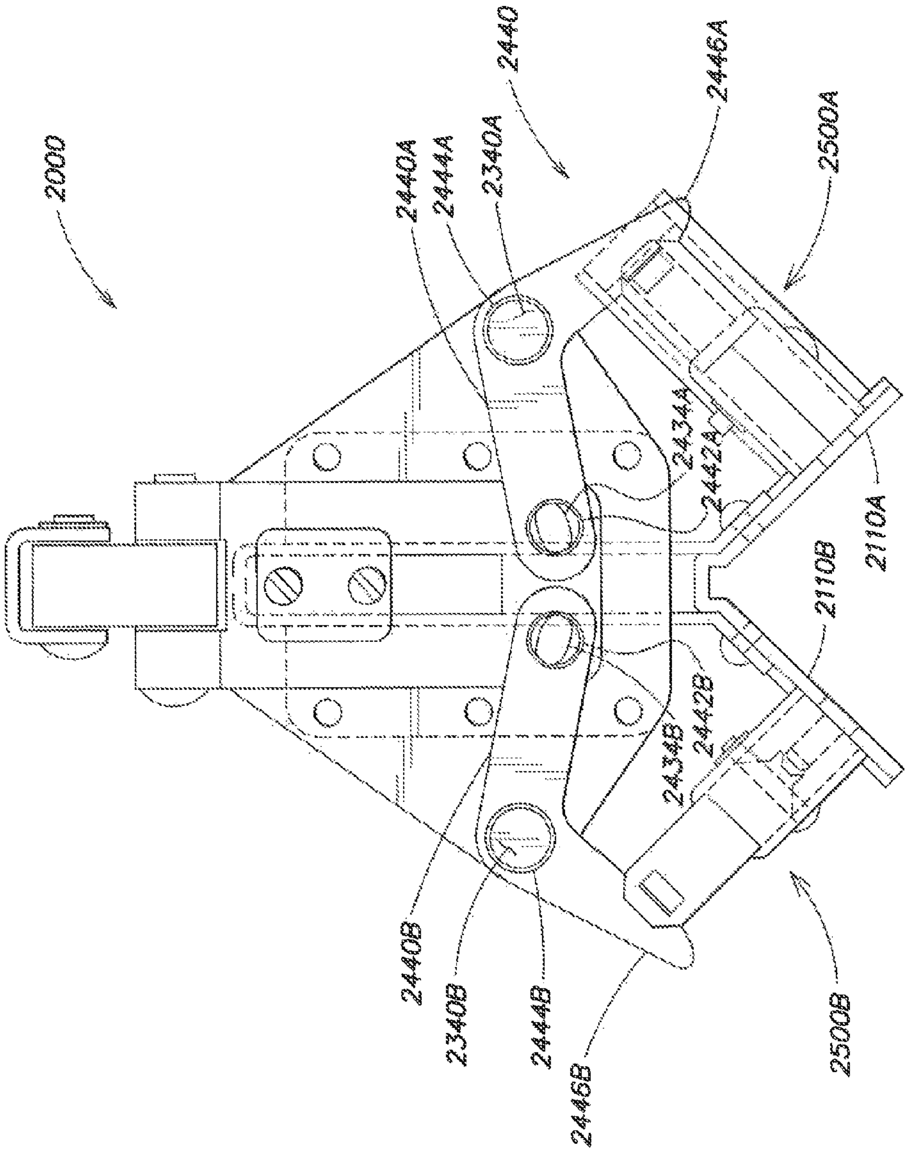
FIG. 31 illustrates a front view of the fastening apparatus in accordance with another exemplary embodiment of the present invention.

Referring to FIG. 30, front and side views of V-shaped frame 2100, support post 2200, and force exertion mechanism 2400 are illustrated. Referring also to FIG. 31, a front view of fastening apparatus 2000 is illustrated. As shown in FIGS. 30 and 31, mechanism 2400 includes a handle 2410, an ankle member 2420, a slider 2430, and a transmission arm 2440. Mechanism 2400 may further include a fulcrum 2412 to provide a pivotal point for handle 2410. Handle 2410 is coupled to ankle member 2420 through fastening device 2415. Ankle member 2420 is coupled to slider 2430 through fastening device 2425. Slider 2430 is coupled to one end of transmission arm 2440 through hinges 2434. A central portion of transmission arm 2440 is pivotally coupled to front plate 2300 through hinges 2340. The other end of transmission arm 2440 is coupled to stapler unit 2500 for exerting force thereon.

Handle 2410 includes a gripping area 2410A at one end of handle 2410, a pivotal aperture 2410B at a central portion of handle 2410, and a coupling aperture 2410C at the other end of handle 2410 opposing gripping area 2410A. Gripping area 2410A may be formed out of plastic or other synthetic resins, as well as natural or synthetic rubber or combinations thereof, or any other suitable material that has a high enough coefficient of friction to ensure a secure grip while preventing fatigue to the operator's hand over prolonged periods.

An upper portion of fulcrum 2412 may be pivotally coupled to handle 2410 through pivotal aperture 2410B, while a bottom portion of fulcrum 2412 may be securely coupled to frame 2100 through fastening devices 2414. An elastic member 2416 may be inserted between handle 2410 and fulcrum 2412. Elastic member 2415 provides force to assist the restoration of gripping area 2410A to its original position after gripping area 2410A is pressed downward. It is noted that fulcrum 2412 may be formed on frame 2100 as an integral portion thereof. In other embodiments, fulcrum 2412 may also be considered as a portion of support post 2200 or a portion of handle 2410.

Ankle member 2420 is coupled to handle 2410 through fastening device 2415 and to slider 2430 through fastening device 2425. When gripping area 2410A is pressed downward, force is transmitted to ankle member 2420 through fulcrum 2412, thereby rendering ankle member 2420 to move upward. Ankle member 2420 then transmit the force to slider 2430 and pulls slider 2430 to move upward.

Slider 2430 is movably coupled to slider guide 2350. A rectangular channel 2436 is defined in slider 2430 so as to allow slider 2430 to move on flat plate 2310 along a longitudinal direction of channel 2436. In one embodiment, slider guide 2350 may have a waist portion that is slightly narrower than the width of channel 2436 and a frontal portion that is wider than the width of channel 2436, such that slider 2430 can move smoothly along slider guide 2350 when handle 2410 is pressed. In this embodiment, an upper portion of slider 2430 is curled to form aperture 2432 for receiving fastening device 2425 therein. In this embodiment, bottom portion of slider 2430 includes a pair of hinges 2434A-B.

Transmission arm 2440 is coupled to slider 2430 through hinges 2434. In this embodiment, transmission arm 2440 includes a right arm 2440A and a left arm 2440B. Right and left arm 2440A-B may have a boomerang shape or an L-shape. An inner end of arms 2440A-B includes apertures 2442A-B for receiving the force from hinges 2434A-B. Specifically, right arm 2440A receives the force from right hinge 2434A coupled to aperture 2442A, while left arm 2240B receives the force from left hinge 2434B coupled to aperture 2442B. In one embodiment, apertures 2442A-B of arms 2440A-B may be formed to provide space for hinges 2434A-B to move therein when slider 2430 is pulled upward in response to a force exerted on handle 2410. A central portion of arms 2440A-B is pivotally coupled to front plate 2300 through hinges 2340A-B. Outer ends 2446A-B of arms 2440A-B are coupled to stapler unit 2500 for exerting force thereon.

In response to a downward force exerted on gripping area 2410, the downward force is transmitted to slider 2430 through ankle member 2420. Slider 2430 then moves upward and pulls transmission arm 2440 to rotate about hinge 2340. As a result, right arm 2440A performs a clockwise rotation, while left arm 2440B performs a counter-clockwise rotation, thereby causing converging of outer portions 2446A-B of transmission arm 2440 and transmitting the force to stapler units 2500A-B.

Figure 32:
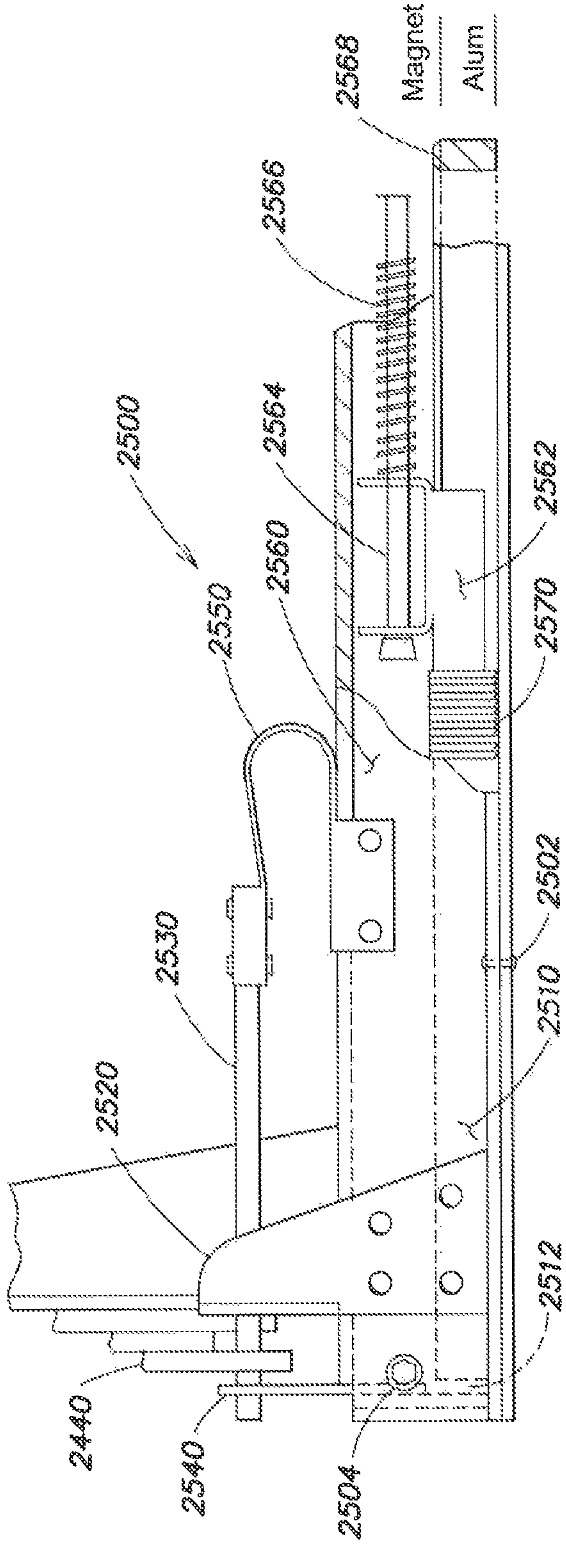
FIG. 32 illustrates a side view of a portion of the fastening apparatus shown in FIG. 31.

Referring to FIG. 32, a side view of stapler unit 2500 is illustrated. As shown in FIGS. 28-32, stapler unit 2500 is formed on flat members 2110 of frame 2100. In this embodiment, stapler unit 2500 includes a right stapler unit 2500A and a left stapler unit 2500B. As shown in FIG. 32, stapler unit 2500 includes a housing 2510, a guiding post 2520, an upper arm 2530, a tooth 2540, an elastic element 2550, and a magazine cartridge 2560.

Housing 2510 includes a slit 2512, which may be used to eject staples 2570. Stapler unit 2500 is securely fastened to frame 2100 using one or more fasting members 2502, such as spot welding or riveting. In this embodiment, when fastening stapler unit 2500 to frame 2100, slit 2512 of stapler unit 2500 is aligned to opening 2130 of frame 2100, such that staples 2570 may be ejected from stapler unit 2500, penetrating through frame 2100.

Upper arm 2530 is coupled to elastic element 2550, which in turn is coupled to housing 2510. Tooth 2540 is coupled to an end of upper arm 2530 opposing elastic element 2550. When transmission arms 2440A-B converge to apply a force, upper arm 2530 and tooth 2540 are pressed downward, thereby pushing one staple 2570 out from magazine cartridge 2560. Elastic element 2550 then assists upper arm 2530 and tooth 2540 to return to their original, un-pressed position. In one embodiment, guiding post 2520 may include a track to confine the movement of upper arm 2530 and to ensure that the pressing force can be effectively transmitted to staple 2570. Further, stapler unit 2500 may include a pin 2504 to guide and stabilize the movement of tooth 2540 when pressed.

Magazine cartridge 2560 includes a carriage 2562 for receiving staples 2570, a rod 2564 for directing carriage 2562 to push staples 2570 towards slit 2512, and a spring 2566 for providing an elastic force to carriage 2562. Magazine cartridge 2560 may optionally include a magnet 2568 at the bottom portion of carriage 2568. Magnet 2568 may attract staples 2570 and ensure that staples 2570 would not become loose when the apparatus of the present invention is used up-side-down for fastening corner beads to, for example, a ceiling.

When operating fastening apparatus 2000 of the present invention, an operator may use a single hand to raise fastening apparatus 2000 by holding gripping area 2410A of handle 2410. The operator may then move fastening apparatus 2000 towards a corner bead on a drywall, such that lower surfaces of flat members 2110A-B receives and contacts the corner bead. Subsequently, the operator exerts a force by pushing gripping area 2410A toward the corner bead. Force transmission mechanism 2410 can split the force to a pair of stapler units 2500A-B, thereby trigging stapler units 2500A-B to simultaneously release fastening pieces from both staplers into the corner bead and an exterior corner of the drywall. As a result, the fastening pieces create a firm attachment of the corner bead to the drywall.

In this particular embodiment, a pair of stapler units 2500A-B are disposed on frame 2500. Accordingly, a pair of transmission arms 2440A-B is used to transmit force from gripping area 2410A to stapler units 2500A-B. It is to be understood that, in alternative embodiments, other quantity of stapler units 2500 may be used to serve substantially same purposes and achieve substantially same results. For example, stapler unit 2500 may include four staplers, which would then require four transmission arms 2440 to transmit the exerted force. Moreover, although stapler unit 2500 is shown and described above, it is to be understood that other devices, such as nail gun, may be employed in place of stapler unit 2500. Accordingly, stapler unit 2500 should be understood as broadly covering any device that can eject or shoot out fastening pieces (e.g., staples, nails, etc.), when an actuating unit (e.g., tooth 2540) is pressed or triggered.

From the foregoing, the reader can appreciate that the invention discloses an apparatus capable of receiving a corner bead within a pair of contact surfaces held by a frame; transmitting to the corner bead force applied to the frame in a first direction; deforming the corner bead with force having a component applied to the frame in a second direction, the second direction being substantially opposite the first direction, the force applied in the second direction being transmitted to and having a direct correlation to a defamation force applied to the corner bead.

Having described herein illustrative embodiments of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not by the particular features which have been shown and described, but shall be construed also to cover any obvious modifications and equivalents thereof.

What is claimed is:

1. An apparatus for enabling single-handed attachment of corner beads comprising:

a frame;

a pair of contact surfaces rigidly coupled to the frame;

a handle pivotally attached to the frame;

a pair of stapler units rigidly coupled to the frame; and a linkage mechanism comprising a pair of transmission arms and mechanically coupling the handle to the stapler units for translating a force displacing the handle from a first position into a controlled motion of the transmission arms, thereby triggering the stapler units to release fastening pieces.

2. The apparatus of claim 1, wherein the linkage mechanism is configured to trigger the stapler units at substantially the same time.

3. The apparatus of claim 1, wherein the contact surfaces define a V-shaped interior and are disposed at an angle of less than 100° therebetween.

4. The apparatus of claim 3, wherein an apex of the angle defines a rectangular protrusion of the frame.

5. The apparatus of claim 1, wherein the linkage mechanism further comprises a slider coupled to the handle, wherein inner ends of the transmission arms are coupled to the slider and outer ends of the transmission arms are coupled to the pair of stapler units.

6. The apparatus of claim 5, further comprising a support post securely fastened to the frame, the support post includes a slider guide.

7. The apparatus of claim 6, wherein a channel is defined in the slider such that the slider is operably guided within the slider guide of the support post.

8. The apparatus of claim 7, wherein the support post comprises a pair of hinges, wherein central portions of the transmission arms are pivotably coupled to the hinges.

9. The apparatus of claim 5, wherein the linkage mechanism further includes an ankle member operably coupled between the handle and the slider.

10. An apparatus for enabling single-handed attachment of corner beads, the apparatus comprising:

a frame;

a pair of contact members, the contact members being formed to define a ridge of the frame;

a handle pivotably coupled to the frame;

a support post disposed on the ridge, the support post defining a flat surface facing toward an end of the frame;

a pair of stapler units disposed on the contact members; and a force transmission mechanism disposed on the flat surface of the support post, wherein the force transmission mechanism is coupled to an end of the handle to receive a force, and wherein the force transmission mechanism transfers the force from the handle to the pair of the stapler units.

11. The apparatus of claim 10, wherein a release opening is defined on the contact members.

12. The apparatus of claim 11, wherein the stapler units comprises a slit for ejecting fastening pieces therefrom, the slit being aligned to the release opening.

13. The apparatus of claim 10, wherein the force transmission mechanism comprises a slider and a pair of transmission arms, first ends of the transmission arms being pivotably coupled to the slider and second ends of the transmission arms being coupled to the stapler units.

14. The apparatus of claim 13, wherein a central portion of the transmission arms being pivotably coupled to a hinge disposed on the support post.

15. The apparatus of claim 13, wherein the slider is operably coupled to an end of the handle.

16. The apparatus of claim 13, wherein the support post further comprises a slider guide, and the slider further comprises a channel defined therein, wherein the slider is engaged with the slider guide through the channel, such that the slider is capable of moving along a longitudinal direction of the channel.

17. The apparatus of claim 13, wherein the force transmission mechanism further comprises an ankle member disposed between the slider and the handle.

18. The apparatus of claim 13, wherein, in response to a force exerted to the handle, the slider transfers the force to the transmission arms, such that the second ends of the transmission arms converges toward each other and triggers the stapler units to release fastening pieces.

* * * * *